(12) United States Patent
Hosono et al.

(10) Patent No.: US 10,863,123 B2
(45) Date of Patent: Dec. 8, 2020

(54) DEFECT PIXEL CORRECTION APPARATUS, DEFECT PIXEL CORRECTION METHOD, NON-TRANSITORY COMPUTER-READABLE MEDIUM STORING COMPUTER PROGRAM

(71) Applicant: Olympus Corporation, Hachioji (JP)

(72) Inventors: Yoshiki Hosono, Hachioji (JP); Yoshinao Shimada, Hino (JP); Ryusuke Tsuchida, Akiruno (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/528,529

(22) Filed: Jul. 31, 2019

(65) Prior Publication Data

US 2020/0045256 A1 Feb. 6, 2020

(30) Foreign Application Priority Data

Aug. 3, 2018 (JP) .................................. 2018-146662

(51) Int. Cl.
*H04N 5/367* (2011.01)
*H04N 9/04* (2006.01)
*H04N 17/00* (2006.01)

(52) U.S. Cl.
CPC ........... *H04N 5/367* (2013.01); *H04N 9/0451* (2018.08); *H04N 17/002* (2013.01)

(58) Field of Classification Search
CPC .... H04N 5/367; H04N 17/002; H04N 9/0451; H04N 5/3675
See application file for complete search history.

(56) References Cited

U.S. PATENT DOCUMENTS

| 2005/0078204 A1* | 4/2005 | Matsuoka | ............ H04N 5/3675 348/247 |
| 2014/0063297 A1* | 3/2014 | Yamura | .................. H04N 5/367 348/242 |

FOREIGN PATENT DOCUMENTS

| JP | 2005-136970 | 5/2005 |
| JP | 5309940 | 7/2013 |

* cited by examiner

*Primary Examiner* — Ahmed A Berhan
(74) *Attorney, Agent, or Firm* — John C. Pokotylo; Pokotylo Patent Services

(57) ABSTRACT

A defect pixel correction apparatus includes an internal memory which associates and stores a position of a defect pixel with an order of the defect pixel in an image sensor and a processor which corrects a pixel signal of an object pixel based on a pixel signal of an adjacent normal pixel when the adjacent normal pixel is present in the neighborhood of the object pixel and corrects the pixel signal of the object pixel based on a pixel signal of an adjacent defect pixel of a lowest order when the adjacent normal pixel is not present and the adjacent defect pixel of a lower order than an order of the object pixel is present.

20 Claims, 21 Drawing Sheets

FIG. 2

| R | Gr | R | Gr | R | Gr | R | Gr | R |
|---|----|---|----|---|----|---|----|---|
| Gb | B | Gb | B | Gb | B | Gb | B | Gb |
| R | Gr | R | Gr | R | Gr | R | Gr | R |
| Gb | B | Gb | B | Gb | B | Gb | B | Gb |
| R | Gr | R | Gr | R | Gr | R | Gr | R |

FIG. 9

| | PIXEL ARRANGEMENTS | EXAMPLES OF CORRECTION |
|---|---|---|
| A<br>EXAMPLE OF OBJECT PIXEL FOR CORRECTION | <table><tr><td>R11</td><td>Gr</td><td>R4</td><td>Gr</td><td>R3</td><td>Gr</td><td>R2</td><td>Gr</td><td>R10</td></tr><tr><td>Gb</td><td>B</td><td>Gb</td><td>B</td><td>Gb</td><td>B</td><td>Gb</td><td>B</td><td>Gb</td></tr><tr><td>R12</td><td>Gr</td><td>R5</td><td>Gr</td><td>R0</td><td>Gr</td><td>R1</td><td>Gr</td><td>R9</td></tr><tr><td>Gb</td><td>B</td><td>Gb</td><td>B</td><td>Gb</td><td>B</td><td>Gb</td><td>B</td><td>Gb</td></tr><tr><td>R13</td><td>Gr</td><td>R6</td><td>Gr</td><td>R7</td><td>Gr</td><td>R8</td><td>Gr</td><td>R14</td></tr></table> | <table><tr><td>CORRECTION METHOD OF R0</td><td>CORRECTION VALUE OF R0</td></tr><tr><td>UP AND DOWN, AND RIGHT AND LEFT</td><td>(R1+R3+R5+R7)/4</td></tr><tr><td>RIGHT AND LEFT</td><td>(R1+R5)/2</td></tr></table> |
| B<br>EXAMPLE OF EXISTENCE OF DEFECT PIXEL AT PERIPHERY OF OBJECT PIXEL FOR CORRECTION | <table><tr><td>R11</td><td>Gr</td><td>R4</td><td>Gr</td><td>R3</td><td>Gr</td><td>R2</td><td>Gr</td><td>R10</td></tr><tr><td>Gb</td><td>B</td><td>Gb</td><td>B</td><td>Gb</td><td>B</td><td>Gb</td><td>B</td><td>Gb</td></tr><tr><td>R12</td><td>Gr</td><td>R5</td><td>Gr</td><td>R0</td><td>Gr</td><td>R1</td><td>Gr</td><td>R9</td></tr><tr><td>Gb</td><td>B</td><td>Gb</td><td>B</td><td>Gb</td><td>B</td><td>Gb</td><td>B</td><td>Gb</td></tr><tr><td>R13</td><td>Gr</td><td>R6</td><td>Gr</td><td>R7</td><td>Gr</td><td>R8</td><td>Gr</td><td>R14</td></tr></table> | <table><tr><td>CORRECTION METHOD OF R0</td><td>CORRECTION VALUE OF R0</td></tr><tr><td>UP AND DOWN, AND RIGHT AND LEFT</td><td>(R1+R3+R7)/3</td></tr><tr><td>RIGHT AND LEFT</td><td>R1</td></tr></table> |

FIG. 10

| KIND OF DEFECT | DEFECT ATTRIBUTE | LONG SECOND /SHORT SECOND | VALIDITY SETTING | ORDER SETTING |
|---|---|---|---|---|
| ADVANCED DARK A DEFECT | 1 | 1 | 1 | 1 |
| DELAYED DARK A DEFECT | 2 | | 1 | 1 |
| ADVANCED BRIGHT A DEFECT | 3 | | 1 | 1 |
| ADVANCED DARK B DEFECT | 4 | | 1 | 2 |
| DELAYED DARK B DEFECT | 5 | | 1 | 2 |
| ADVANCED BRIGHT B DEFECT | 6 | | 1 | 3 |
| ADVANCED DARK C DEFECT | 7 | | 1 | 4 |
| ADAPTIVE DEFECT | 8 | | 1 | 5 |
| ... | ... | | — | — |

FIG. 11

| KIND OF DEFECT | DEFECT ATTRIBUTE | LONG SECOND /SHORT SECOND | VALIDITY SETTING | ORDER SETTING |
|---|---|---|---|---|
| ADVANCED DARK A DEFECT | 1 | 0 | 1 | 1 |
| DELAYED DARK A DEFECT | 2 | | 1 | 1 |
| ADVANCED BRIGHT A DEFECT | 3 | | 1 | 1 |
| ADVANCED DARK B DEFECT | 4 | | 1 | 2 |
| DELAYED DARK B DEFECT | 5 | | 1 | 2 |
| ADVANCED BRIGHT B DEFECT | 6 | | 1 | 3 |
| ADVANCED DARK C DEFECT | 7 | | 0 | 4 |
| ADAPTIVE DEFECT | 8 | | 1 | 5 |
| ... | ... | | — | — |

FIG. 13

| PIXEL ARRANGEMENT | | | | | | | | | |
|---|---|---|---|---|---|---|---|---|---|
| | R11 | Gr | R4 | Gr | R3 | Gr | R2 | Gr | R10 |
| | Gb | B | Gb | B | Gb | B | Gb | B | Gb |
| | R12 | Gr | R5 | Gr | R0 | Gr | R1 | Gr | R9 |
| | Gb | B | Gb | B | Gb | B | Gb | B | Gb |
| | R13 | Gr | R6 | Gr | R7 | Gr | R8 | Gr | R14 |

ATTRIBUTE:
- row 1 col 5: 8
- row 3 col 3: —, col 5: 1, col 7: —
- row 5 col 5: —

ORDER:
- row 1 col 5: 5
- row 3 col 3: —, col 5: 1, col 7: —
- row 5 col 5: —

PERMISSION OF USE

| R | ATTRIBUTE | ORDER | ORDER RELATIONSHIP | CORRECTION VALUE CALCULATION |
|---|---|---|---|---|
| R0 | 1 | 1 | — (OBJECT PIXEL FOR CORRECTION) | |
| R1 | — | — | — (NORMAL PIXEL) | USABLE |
| R3 | 8 | 5 | LESS THAN R0 (5<1) | NON-USABLE |
| R5 | — | — | — (NORMAL PIXEL) | USABLE |
| R7 | — | — | — (NORMAL PIXEL) | USABLE |

EXAMPLE OF CORRECTION

| CORRECTION METHOD OF R0 | CORRECTION VALUE OF R0 |
|---|---|
| UP AND DOWN, AND RIGHT AND LEFT | (R1+R5+R7)/3 |
| RIGHT AND LEFT | (R1+R5)/2 |

FIG. 14

| | | |
|---|---|---|
| PIXEL ARRANGEMENT | | R11\|Gr\|R4\|Gr\|R3\|Gr\|R2\|Gr\|R10<br>Gb\|B\|Gb\|B\|Gb\|B\|Gb\|B\|Gb<br>R12\|Gr\|R5\|Gr\|R0\|Gr\|R1\|Gr\|R9<br>Gb\|B\|Gb\|B\|Gb\|B\|Gb\|B\|Gb<br>R13\|Gr\|R6\|Gr\|R7\|Gr\|R8\|Gr\|R14 |
| ATTRIBUTE | | 7×7 grid with: 8 (row 1, col 4); 1 (row 2, col 2); 1 (row 2, col 4); 8 (row 2, col 6); 2 (row 4, col 4) |
| ORDER | | 7×7 grid with: 5 (row 1, col 4); 1 (row 2, col 2); 1 (row 2, col 4); 5 (row 2, col 6); 1 (row 4, col 4) |

| | R | ATTRIBUTE | ORDER | ORDER RELATIONSHIP | CORRECTION VALUE CALCULATION |
|---|---|---|---|---|---|
| PERMISSION OF USE | R0 | 1 | 1 | — (OBJECT PIXEL FOR CORRECTION) | |
| | R1 | 8 | 5 | LESS THAN R0 (5<1) | USABLE |
| | R3 | 8 | 5 | LESS THAN R0 (5<1) | USABLE |
| | R5 | 1 | 1 | EQUAL TO R0 (1=1) | NON-USABLE |
| | R7 | 2 | 1 | EQUAL TO R0 (1=1) | NON-USABLE |

| | CORRECTION METHOD OF R0 | CORRECTION VALUE OF R0 |
|---|---|---|
| EXAMPLE OF CORRECTION | UP AND DOWN, AND RIGHT AND LEFT | (R1+R3)/2 |
| | RIGHT AND LEFT | R1 |

FIG. 15

| | | | | | | | | | | |
|---|---|---|---|---|---|---|---|---|---|---|
| PIXEL ARRANGEMENT | | R11 | Gr | R4 | Gr | R3 | Gr | R2 | Gr | R10 |
| | | Gb | B | Gb | B | Gb | B | Gb | B | Gb |
| | | R12 | Gr | R5 | Gr | R0 | Gr | R1 | Gr | R9 |
| | | Gb | B | Gb | B | Gb | B | Gb | B | Gb |
| | | R13 | Gr | R6 | Gr | R7 | Gr | R8 | Gr | R14 |

| ATTRIBUTE | | | | | 6 | | |
|---|---|---|---|---|---|---|---|
| | | | | | | | |
| | | | | 1 | 1 | 8 | |
| | | | | | | | |
| | | | | | 2 | | |

| ORDER | | | | | 3 | | |
|---|---|---|---|---|---|---|---|
| | | | | | | | |
| | | | | 1 | 1 | 5 | |
| | | | | | | | |
| | | | | | 1 | | |

| PERMISSION OF USE | R | ATTRIBUTE | ORDER | ORDER RELATIONSHIP | CORRECTION VALUE CALCULATION |
|---|---|---|---|---|---|
| | R0 | 1 | 1 | — (OBJECT PIXEL FOR CORRECTION) | |
| | R1 | 8 | 5 | LESS THAN R0 (5<1) | USABLE |
| | R3 | 6 | 3 | LESS THAN R0 (3<1) | NON-USABLE |
| | R5 | 1 | 1 | EQUAL TO R0 (1=1) | NON-USABLE |
| | R7 | 2 | 1 | EQUAL TO R0 (1=1) | NON-USABLE |

| EXAMPLE OF CORRECTION | CORRECTION METHOD OF R0 | CORRECTION VALUE OF R0 |
|---|---|---|
| | UP AND DOWN, AND RIGHT AND LEFT | R1 |
| | RIGHT AND LEFT | R1 |

FIG. 16

| | | | | | | | | | | |
|---|---|---|---|---|---|---|---|---|---|---|
| PIXEL ARRANGEMENT | | R11 | Gr | R4 | Gr | R3 | Gr | R2 | Gr | R10 |
| | | Gb | B | Gb | B | Gb | B | Gb | B | Gb |
| | | R12 | Gr | R5 | Gr | R0 | Gr | R7 | Gr | R9 |
| | | Gb | B | Gb | B | Gb | B | Gb | B | Gb |
| | | R13 | Gr | R6 | Gr | R8 | Gr | R8 | Gr | R14 |

| ATTRIBUTE | | | | | 7 | | | | |
|---|---|---|---|---|---|---|---|---|---|
| | | | | 1 | | 1 | | 8 | |
| | | | | | | | | | |
| | | | | | | 2 | | | |

| ORDER | | | | | 4 | | | | |
|---|---|---|---|---|---|---|---|---|---|
| | | | | 1 | | 1 | | 5 | |
| | | | | | | | | | |
| | | | | | | 1 | | | |

| | R | ATTRIBUTE | ORDER | ORDER RELATIONSHIP | CORRECTION VALUE CALCULATION |
|---|---|---|---|---|---|
| PERMISSION OF USE | R0 | 1 | 1 | — (OBJECT PIXEL FOR CORRECTION) | |
| | R1 | 8 | 5 | LESS THAN R0 (5<1) | USABLE |
| | R3 | 7 | 4 | LESS THAN R0 (4<1) | NON-USABLE |
| | R5 | 1 | 1 | EQUAL TO R0 (1=1) | NON-USABLE |
| | R7 | 2 | 1 | EQUAL TO R0 (1=1) | NON-USABLE |

| | CORRECTION METHOD OF R0 | CORRECTION VALUE OF R0 |
|---|---|---|
| EXAMPLE OF CORRECTION | UP AND DOWN, AND RIGHT AND LEFT | R1 |
| | RIGHT AND LEFT | R1 |

FIG. 17

| | | | | | | | | | | |
|---|---|---|---|---|---|---|---|---|---|---|
| PIXEL ARRANGEMENT | | R11 | Gr | R4 | Gr | R3 | Gr | R2 | Gr | R10 |
| | | Gb | B | Gb | B | Gb | B | Gb | B | Gb |
| | | R12 | Gr | R5 | Gr | R0 | Gr | R1 | Gr | R9 |
| | | Gb | B | Gb | B | Gb | B | Gb | B | Gb |
| | | R13 | Gr | R6 | Gr | R7 | Gr | R8 | Gr | R14 |

ATTRIBUTE

|   |   |   |   |   |
|---|---|---|---|---|
|   |   | 8 |   |   |
|   | 1 | 1 | 7 |   |
|   |   |   |   |   |
|   |   | 2 |   |   |

ORDER

|   |   |   |   |   |
|---|---|---|---|---|
|   |   | 5 |   |   |
|   | 1 | 1 | (4) |   |
|   |   |   |   |   |
|   |   | 1 |   |   |

PERMISSION OF USE

| R | ATTRIBUTE | ORDER | ORDER RELATIONSHIP | CORRECTION VALUE CALCULATION |
|---|---|---|---|---|
| R0 | 1 | 1 | — (OBJECT PIXEL FOR CORRECTION) | |
| R1 | (7) | (4) | — (HANDLED AS NORMAL PIXEL) | USABLE |
| R3 | 8 | 5 | LESS THAN R0 (5<1) | NON-USABLE |
| R5 | 1 | 1 | EQUAL TO R0 (1=1) | NON-USABLE |
| R7 | 2 | 1 | EQUAL TO R0 (1=1) | NON-USABLE |

EXAMPLE OF CORRECTION

| CORRECTION METHOD OF R0 | CORRECTION VALUE OF R0 |
|---|---|
| UP AND DOWN, AND RIGHT AND LEFT | R1 |
| RIGHT AND LEFT | R1 |

FIG. 18

| PIXEL ARRANGEMENT | | | | | | | | | | |
|---|---|---|---|---|---|---|---|---|---|---|
| | | R11 | Gr | R4 | Gr | R3 | Gr | R2 | Gr | R10 |
| | | Gb | B | Gb | B | Gb | B | Gb | B | Gb |
| | | R12 | Gr | R5 | Gr | R0 | Gr | R1 | Gr | R9 |
| | | Gb | B | Gb | B | Gb | B | Gb | B | Gb |
| | | R13 | Gr | R6 | Gr | R7 | Gr | R8 | Gr | R14 |

| ATTRIBUTE | | | | | | | |
|---|---|---|---|---|---|---|---|
| | | | | | 5 | | |
| | | 6 | | 1 | 4 | 5 | — |
| | | | | | 2 | | |

| ORDER | | | | | | | |
|---|---|---|---|---|---|---|---|
| | | | | | 2 | | |
| | | N.C. | | 1 | 2 | 2 | N.C. |
| | | | | | 1 | | |

| PERMISSION OF USE | R | ATTRIBUTE | ORDER | ORDER RELATIONSHIP | CORRECTION VALUE CALCULATION |
|---|---|---|---|---|---|
| | R0 | 4 | 2 | — (OBJECT PIXEL FOR CORRECTION) | |
| | R1 | 5 | 2 | EQUAL TO R0 (2=2) | NON-USABLE |
| | R3 | 5 | 2 | EQUAL TO R0 (2=2) | NON-USABLE |
| | R5 | 1 | 1 | NOT LOWER THAN R0 (1>2) | NON-USABLE |
| | R7 | 2 | 1 | NOT LOWER THAN R0 (1>2) | NON-USABLE |
| | R12 | 6 | N. C. | ORDER IS NOT CONSIDERED | NON-USABLE |
| | R9 | — | — | — (NORMAL PIXEL) | USABLE |

| EXAMPLE OF CORRECTION | CORRECTION METHOD OF R0 | CORRECTION VALUE OF R0 |
|---|---|---|
| | RIGHT AND LEFT | R9 |

FIG. 19

| PIXEL ARRANGEMENT | |
|---|---|
| | R11 Gr R4 Gr R0 Gr R2 Gr R10<br>Gb B Gb B Gb B Gb B Gb<br>R12 Gr R5 Gr R0 Gr R1 Gr R9<br>Gb B Gb B Gb B Gb B Gb<br>R13 Gr R6 Gr R7 Gr R8 Gr R14 |

| ATTRIBUTE | |
|---|---|
| | 8  5  —<br> 1  4  5<br> —  2  8 |

| ORDER | |
|---|---|
| | 5  2  —<br> 1  2  2<br> —  1  5 |

| PERMISSION OF USE | R | ATTRIBUTE | ORDER | ORDER RELATIONSHIP | CORRECTION VALUE CALCULATION |
|---|---|---|---|---|---|
| | R0 | 4 | 2 | — (OBJECT PIXEL FOR CORRECTION) | |
| | R1 | 5 | 2 | EQUAL TO R0 (2=2) | NON-USABLE |
| | R3 | 5 | 2 | EQUAL TO R0 (2=2) | NON-USABLE |
| | R5 | 1 | 1 | NOT LOWER THAN R0 (1>2) | NON-USABLE |
| | R7 | 2 | 1 | NOT LOWER THAN R0 (1>2) | NON-USABLE |
| | R2 | — | — | — (NORMAL PIXEL) | USABLE |
| | R4 | 8 | 5 | LESS THAN R0 (5<2) | NON-USABLE |
| | R6 | — | — | — (NORMAL PIXEL) | USABLE |
| | R8 | 8 | 5 | LESS THAN R0 (5<2) | NON-USABLE |

| EXAMPLE OF CORRECTION | CORRECTION METHOD OF R0 | CORRECTION VALUE OF R0 |
|---|---|---|
| | OBLIQUE | (R2+R6)/2 |

FIG. 20

| PIXEL ARRANGEMENT | | | | | | | | | | |
|---|---|---|---|---|---|---|---|---|---|---|
| | R11 | Gr | R4 | Gr | R3 | Gr | R2 | Gr | R10 | |
| | Gb | B | Gb | B | Gb | B | Gb | B | Gb | |
| | R12 | Gr | R5 | Gr | R0 | Gr | R1 | Gr | R9 | |
| | Gb | B | Gb | B | Gb | B | Gb | B | Gb | |
| | R13 | Gr | R6 | Gr | R7 | Gr | R8 | Gr | R14 | |

ATTRIBUTE:

|   |   |   |   |   |   |   |
|---|---|---|---|---|---|---|
|   |   |   |   |   |   |   |
|   |   | 8 | 5 | 6 |   |   |
|   |   | 1 | 4 | 5 |   |   |
|   |   |   |   |   |   |   |
|   |   | 8 | 2 | 8 |   |   |

ORDER:

|   |   |   |   |   |   |   |
|---|---|---|---|---|---|---|
|   |   |   |   |   |   |   |
|   |   | 5 | 2 | 3 |   |   |
|   |   | 1 | 2 | 2 |   |   |
|   |   |   |   |   |   |   |
|   |   | 5 | 1 | 5 |   |   |

PERMISSION OF USE:

| R | ATTRIBUTE | ORDER | ORDER RELATIONSHIP | CORRECTION VALUE CALCULATION |
|---|---|---|---|---|
| R0 | 4 | 2 | —(OBJECT PIXEL FOR CORRECTION) | |
| R1 | 5 | 2 | EQUAL TO R0 (2=2) | NON-USABLE |
| R3 | 5 | 2 | EQUAL TO R0 (2=2) | NON-USABLE |
| R5 | 1 | 1 | NOT LOWER THAN R0 (1>2) | NON-USABLE |
| R7 | 2 | 1 | NOT LOWER THAN R0 (1>2) | NON-USABLE |
| R2 | 6 | 3 | LESS THAN R0 (3<2) | NON-USABLE |
| R4 | 8 | 5 | LESS THAN R0 (5<2) | USABLE |
| R6 | 8 | 5 | LESS THAN R0 (5<2) | USABLE |
| R8 | 8 | 5 | LESS THAN R0 (5<2) | USABLE |

EXAMPLE OF CORRECTION:

| CORRECTION METHOD OF R0 | CORRECTION VALUE OF R0 |
|---|---|
| OBLIQUE | (R4+R6+R8)/3 |

FIG. 21

| | |
|---|---|
| PIXEL ARRANGEMENT | <table><tr><td>Gr11</td><td>R</td><td>Gr4</td><td>R</td><td>Gr3</td><td>R</td><td>GR2</td><td>R</td><td>Gr10</td></tr><tr><td>B</td><td>Gb6</td><td>B</td><td>Gb2</td><td>B</td><td>Gb1</td><td>B</td><td>Gb5</td><td>B</td></tr><tr><td>Gr12</td><td>R</td><td>Gr5</td><td>R</td><td>Gr0</td><td>R</td><td>Gr1</td><td>R</td><td>Gr9</td></tr><tr><td>B</td><td>Gb7</td><td>B</td><td>Gb3</td><td>B</td><td>Gb4</td><td>B</td><td>Gb8</td><td>B</td></tr><tr><td>Gr13</td><td>R</td><td>Gr6</td><td>R</td><td>Gr7</td><td>R</td><td>Gr8</td><td>R</td><td>Gr14</td></tr></table> |
| ATTRIBUTE | grid with: — , 5 / 4 / 4 , — |
| ORDER | grid with: — , 2 / 2 / 2 , — |
| PERMISSION OF USE | see table below |
| EXAMPLE OF CORRECTION | see table below |

Permission of Use:

| G | ATTRIBUTE | ORDER | ORDER RELATIONSHIP | CORRECTION VALUE CALCULATION |
|---|---|---|---|---|
| Gr0 | 4 | 2 | — (OBJECT PIXEL FOR CORRECTION) | |
| Gb1 | 5 | 2 | EQUAL TO Gr0 (2=2) | NON-USABLE |
| Gb2 | — | — | — (NORMAL PIXEL) | USABLE |
| Gb3 | 4 | 2 | EQUAL TO Gr0 (2=2) | NON-USABLE |
| Gb4 | — | — | — (NORMAL PIXEL) | USABLE |

Example of Correction:

| CORRECTION METHOD OF Gr0 | CORRECTION VALUE OF Gr0 |
|---|---|
| OBLIQUE | (Gb2+Gb4)/2 |

FIG. 22

| | | | | | | | | | | |
|---|---|---|---|---|---|---|---|---|---|---|
| PIXEL ARRANGEMENT | | Gr11 | R | Gr4 | R | Gr3 | R | GR2 | R | Gr10 |
| | | B | Gb6 | B | Gb2 | B | Gb1 | B | Gb5 | B |
| | | Gr12 | R | Gr5 | R | Gr0 | R | Gr1 | R | Gr9 |
| | | B | Gb7 | B | Gb3 | B | Gb4 | B | Gb8 | B |
| | | Gr13 | R | Gr6 | R | Gr7 | R | Gr8 | R | Gr14 |

| ATTRIBUTE | | | | | | | | | | |
|---|---|---|---|---|---|---|---|---|---|---|
| | | | | | | 4 | | 5 | | |
| | | | | | | | 4 | | | |
| | | | | | | 7 | | 7 | | |
| | | | | | | | | | | |

| ORDER | | | | | | | | | | |
|---|---|---|---|---|---|---|---|---|---|---|
| | | | | | | 2 | | 2 | | |
| | | | | | | | 2 | | | |
| | | | | | | 4 | | 4 | | |
| | | | | | | | | | | |

| PERMISSION OF USE | R | ATTRIBUTE | ORDER | ORDER RELATIONSHIP | CORRECTION VALUE CALCULATION |
|---|---|---|---|---|---|
| | Gr0 | 4 | 2 | — (OBJECT PIXEL FOR CORRECTION) | |
| | Gb1 | 5 | 2 | EQUAL TO Gr0 (2=2) | NON-USABLE |
| | Gb2 | 4 | 2 | EQUAL TO Gr0 (2=2) | NON-USABLE |
| | Gb3 | 7 | 4 | LESS THAN Gr0 (4<2) | USABLE |
| | Gb4 | 7 | 4 | LESS THAN Gr0 (4<2) | USABLE |

| EXAMPLE OF CORRECTION | CORRECTION METHOD OF Gr0 | CORRECTION VALUE OF Gr0 |
|---|---|---|
| | OBLIQUE | (Gb3+Gb4)/2 |

DEFECT PIXEL CORRECTION APPARATUS, DEFECT PIXEL CORRECTION METHOD, NON-TRANSITORY COMPUTER-READABLE MEDIUM STORING COMPUTER PROGRAM

CROSS REFERENCE TO RELATED APPLICATION

This application claims benefit of Japanese Application No. 2018-146662 filed in Japan on Aug. 3, 2018, the entire contents of which are incorporated herein by this reference.

BACKGROUND OF THE INVENTION

1. Field of the Invention

The present invention relates to a defect pixel correction apparatus which corrects a pixel signal of defect pixel to a pixel signal outputted from an image sensor, a defect pixel correction method and a non-transitory computer-readable medium storing a computer program.

2. Description of the Related Art

Conventionally, in an image pickup apparatus such as a digital camera or a video camera, a solid-state image sensor such as a CMOS (complementary metal oxide semiconductor) image sensor and a CCD (charge coupled device) image sensor has been generally used.

The solid-state image sensor often generates a defect pixel which generates a pixel signal which is different from a normal pixel in a manufacturing process. The defect pixel is one of the factors which lower the quality of a picked-up image, and one of the factors which lower fabrication yield of the solid-state image sensor.

Japanese Patent Application Laid-Open Publication No. 2005-136970 discloses the technology in which, with a consideration that there is a case where no detection as a defect pixel is made even when defect detection is executed at the time of factory shipment or there is a case that a defect level increases after the defect detection, a result of defect detection at the time of factory shipment and a result of defect detection after the factory shipment are separately stored, and if there is any information with a plurality of defect levels to the same pixel position, interpolation of the defect pixel is executed using defect information with a high defect level.

With this technology, a defect pixel newly generated after the factory shipment can be detected and added to the defect information, and further, new defect information can be stored even when the defect level of a defect pixel detected at the time of the factory shipment increases after the factory shipment. Accordingly, it is believed that the state of an image with high image quality can be maintained over a long period in accordance with addition of the defect pixel or change of the defect level.

Japanese Patent No. 5309940 discloses the technology that, with a premise that all pixels adjacent to a defect pixel subjected to interpolation are normal pixels, an optimum computational equation is selected among a plurality of computational equations for computation of an interpolated value having different interpolation accuracy to calculate a pixel signal of a pixel subjected to interpolation.

SUMMARY OF THE INVENTION

According to one aspect of the present invention, there is provided a defect pixel correction apparatus which corrects a pixel signal of a defect pixel to a pixel signal outputted from an image sensor including a plurality of pixels including the defect pixel, the defect pixel correction apparatus including: a memory which associates and stores a position of the defect pixel with an order of the defect pixel; and a processor including hardware. The processor sets a neighborhood to an object pixel which is the defect pixel, corrects a pixel signal of the object pixel based on a pixel signal of an adjacent normal pixel when the adjacent normal pixel is present, and corrects a pixel signal of the object pixel based on a pixel signal of an adjacent defect pixel of a lowest order when the adjacent normal pixel is not present and the adjacent defect pixel of a lower order than an order of the object pixel is present, wherein the adjacent normal pixel is a normal pixel in the neighborhood, and the adjacent defect pixel is a defect pixel in the neighborhood.

According to another aspect of the present invention, there is provided a defect pixel correction method of correcting a pixel signal of a defect pixel to a pixel signal outputted from an image sensor including a plurality of pixels including the defect pixel, the defect pixel correction method including the steps of: setting a neighborhood to an object pixel which is the defect pixel based on an output of a memory which associates and stores a position of the defect pixel with an order of the defect pixel; correcting, based on the output of the memory, a pixel signal of the object pixel based on a pixel signal of the adjacent normal pixel when an adjacent normal pixel is present; and correcting, based on the output of the memory, a pixel signal of the object pixel based on a pixel signal of an adjacent defect pixel of a lowest order when the adjacent normal pixel is not present and the adjacent defect pixel of a lower order than an order of the object pixel is present, wherein, the adjacent normal pixel is a normal pixel in the neighborhood, and the adjacent defect pixel is a defect pixel in the neighborhood.

According to still another aspect of the present invention, there is provided a non-transitory computer-readable medium storing a computer program, wherein the computer program is a program which causes the computer to correct a pixel signal of a defect pixel to a pixel signal outputted from an image sensor including a plurality of pixels including the defect pixel, and based on an output of a memory which associates and stores a position of the defect pixel with an order of the defect pixel, the computer program causes the computer to execute the following: setting a neighborhood to an object pixel which is the defect pixel; correcting, when an adjacent normal pixel is present, a pixel signal of the object pixel based on a pixel signal of the adjacent normal pixel; and correcting a pixel signal of the object pixel based on a pixel signal of an adjacent defect pixel of a lowest order when the adjacent normal pixel is not present and the adjacent defect pixel of a lower order than an order of the object pixel is present, wherein the adjacent normal pixel is a normal pixel in the neighborhood, and the adjacent defect pixel is a defect pixel in the neighborhood.

BRIEF DESCRIPTION OF THE DRAWINGS

FIG. 2 is a diagram showing a color configuration example of pixels in an image sensor of the first embodiment;

FIG. 9 is a table showing a general correction example when a normal pixel is located at the periphery of an object pixel for correction in the first embodiment;

FIG. 10 is a table showing an example of order setting of a defect pixel in a long exposure time in the first embodiment;

FIG. 11 is a table showing an example of order setting of the defect pixel in a short exposure time in the first embodiment;

FIG. 13 is a table showing a correction example where the normal pixel and the defect pixel are present adjacent to the object pixel for correction in the first embodiment;

FIG. 14 is a table showing a correction example where, although no normal pixel is present in the neighborhood, one or more adjacent defect pixels having the lowest order which is the defect pixel of a lower order than the order of the object pixel for correction are present in the first embodiment;

FIG. 15 is a table showing a correction example where, although no normal pixel is present in the neighborhood, only one adjacent defect pixel having the lowest order which is the defect pixel of a lower order than the order of the object pixel for correction is present in the first embodiment;

FIG. 16 is a table showing a correction example where, in the long exposure time, although no normal pixel is present in the neighborhood, only one adjacent defect pixel having the lowest order which is the defect pixel of a lower order than the order of the object pixel for correction is present in the first embodiment;

FIG. 17 is a table showing a correction example where, in the short exposure time, a pixel to be handled as the normal pixel occurs in the neighborhood in the first embodiment;

FIG. 18 is a table showing a correction example where, when no normal pixel is present in the neighborhood and no defect pixel of a lower order than the order of the object pixel for correction is present, there is only one normal pixel in the second neighborhood when one-dimensional correction is executed in the first embodiment;

FIG. 19 is a table showing a correction example where, when no normal pixel is present in the neighborhood and no defect pixel of a lower order than the order of the object pixel for correction is present, two normal pixels are present in the second neighborhood when the two-dimensional correction is executed in the first embodiment;

FIG. 20 is a table showing a correction example in which, in a case where the two-dimensional correction is executed when no normal pixel is present in the neighborhood and when no defect pixel of a lower order than the order of the object pixel for correction is present, if no normal pixel is present in the second neighborhood and there pixels are present as the second adjacent defect pixels having the lowest order which are the defect pixels of a lower order than the order of the object pixel for correction in the first embodiment;

FIG. 21 is a table showing a correction example in a case where the normal pixel and the defect pixel are located in the neighborhood when a Gr pixel and a Gb pixel are handled as the same color in the first embodiment; and FIG. 22 is a table showing a correction example where, when the Gr pixel and the Gb pixel are handled as the same color, although no normal pixel is present in the neighborhood of the object pixel for correction, one or more adjacent defect pixels having the lowest order which is the defect pixel of a lower order than the order of the object pixel for correction are present in the first embodiment.

DETAILED DESCRIPTION OF THE PREFERRED EMBODIMENT(S)

Hereinafter, an embodiment according to the present invention will be explained with reference to drawings.

First Embodiment

Figure 1:
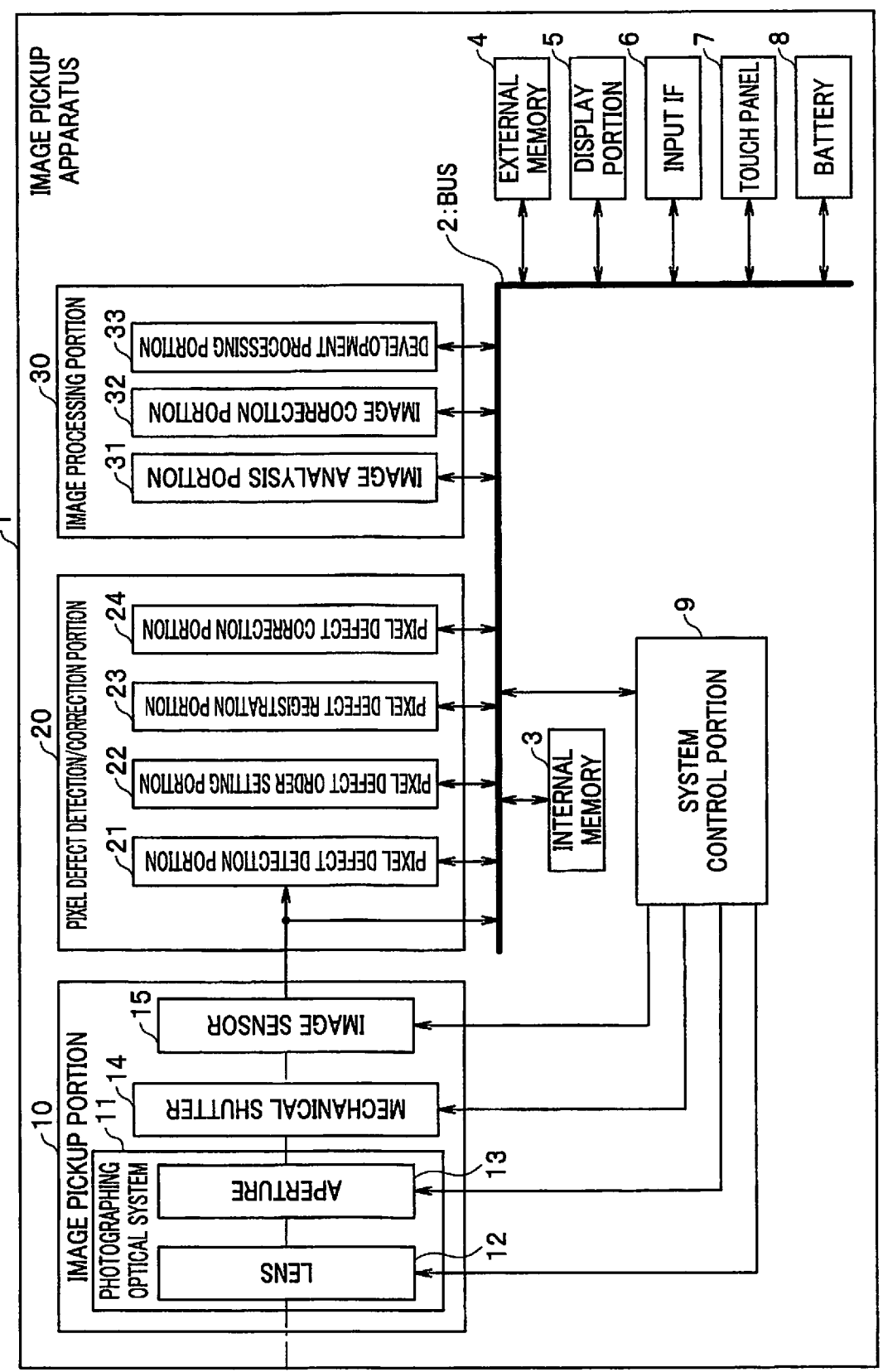
FIG. 1 is a block diagram showing a configuration of an image pickup apparatus including a defect pixel correction apparatus according to a first embodiment of the present invention.

FIGS. 1 to 22 show the first embodiment according to the present invention. FIG. 1 is a block diagram showing the configuration of an image pickup apparatus 1 including a defect pixel correction apparatus.

The image pickup apparatus 1 includes an image pickup portion 10, a pixel defect detection/correction portion 20, an image processing portion 30, a bus 2, an internal memory 3, an external memory 4, a display portion 5, an input interface (input IF) 6, a touch panel 7, a battery 8 and a system control portion 9.

The image pickup portion 10 includes a photographing optical system 11, a mechanical shutter 14 and an image sensor 15.

The photographing optical system 11 includes a lens 12 which forms an optical image of an object on the image sensor 15 and an aperture 13 which controls a passing range of the light flux which passes through the lens 12 to reach the image sensor 15.

The mechanical shutter 14 mechanically controls an exposure time of an image by controlling a passage time of the light flux which passes through the lens 12 to reach the image sensor 15. Note that the control of the exposure time is not limited to be executed by the mechanical shutter 14, and may be executed by a so-called electronic shutter which controls a charge storage time of the image sensor 15.

The image sensor 15 generates an image pickup signal by photoelectric conversion of an optical image of the object formed by the photographing optical system 11. In the image sensor 15, a plurality of pixels subjected to photoelectric conversion are arranged in a two-dimensional manner, and the image pickup signal includes a plurality of pixel signals.

The image sensor 15 is configured as a solid-state image sensor such as a CMOS (complementary metal oxide semiconductor) image sensor or a CCD (charge coupled device) image sensor. Here, the solid-state image sensor is manufactured by forming an integrated circuit on a solid such as a semiconductor single crystal using the technique of a semiconductor process, etc.

Here, FIG. 2 is a diagram showing a color configuration example of pixels in the image sensor 15.

The image sensor 15 is configured as a color image sensor which has a plurality of colors of pixels and outputs a plurality of colors of pixel signals, for example. As shown in FIG. 2, in an example shown in this embodiment, the image sensor 15 includes R pixels, Gr pixels arranged on the same line as the R pixels, B pixels, and Gb pixels arranged on the same line as the B pixels, which are arranged in a primary color Bayer arrangement.

Generally, the image sensor 15 includes, as a pixel area in which pixels are arranged, a normal pixel area irradiated with light from the photographing optical system 11 and an OB (optical black) pixel area in which light from the photographing optical system 11 is blocked.

The image sensor 15 is assumed as a digital image sensor which executes A/D conversion of a pixel signal to output the pixel signal as a digital pixel signal. However, when the image sensor 15 is regarded as an analog image sensor which outputs an analog pixel signal, an additional A/D converter may be provided outside the image sensor 15.

The pixel defect detection/correction portion 20 detects a defect pixel included in the plurality of pixels arranged in the image sensor 15 and additionally registers a new detection result in the internal memory 3, and based on the registered information of the defect pixel, corrects a pixel signal of the defect pixel included in an image pickup signal obtained from the image sensor 15. More specifically, the pixel defect detection/correction portion 20 includes a pixel defect detection portion 21, a pixel defect order setting portion 22, a pixel defect registration portion 23 and a pixel defect correction portion 24. Note that the pixel defect detection/correction portion 20 is configured to perform the function of each of the portions in the pixel detect detection/correction portion 20 by causing a processor including hardware such as CPU to execute software. However, the configuration of the pixel defect detection/correction portion 20 is not limited to such a configuration, but the pixel defect detection/correction portion 20 may be configured by a processor including electronic circuits (hardware) corresponding to the respective portions in the pixel detect detection/correction portion 20. Alternatively, the pixel defect detection/correction portion 20 may be configured by circuit portions in a processor including an integrated circuit (hardware) such as an FPGA (Field Programmable Gate Array).

The pixel defect detection portion 21 detects the defect pixel based on a pixel signal outputted from the image sensor 15. Here, the information of the defect pixel (pixel defect information) of the image sensor 15 at the time when the image pickup apparatus 1 is manufactured is previously stored in the internal memory 3. Accordingly, the pixel defect detection portion 21 is mainly used to obtain the information of the defect pixel after the image pickup apparatus 1 is manufactured (needless to say, the pixel defect detection portion 21 may detect a defect at the time of manufacturing.)

The information of the defect pixel after the manufacturing includes the information of a newly generated defect pixel, the information of the existing defect pixel in which the defect level is changed, and the information of a defect pixel which is detected at this time although not detected in a test at the time of manufacturing. Moreover, the information of the defect pixel includes the position of the defect pixel and defect attribute showing the kind of the defect pixel (see FIG. 3).

The pixel defect order setting portion 22 sets the order in accordance with the defect attribute of the defect pixel. Here, the order set in accordance with the defect attribute of the defect pixel may be changed in accordance with the shooting condition, for example. In this case, the pixel defect order setting portion 22 obtains the information of the shooting condition to set the order suitable for the obtained shooting condition (see FIGS. 10, 11, etc. which will be described later). Association of the defect attribute of the defect pixel with the order set by the pixel defect order setting portion 22 is stored in the internal memory 3.

The pixel defect registration portion 23 stores the information of the defect pixel detected by the pixel defect detection portion 21 in the internal memory 3.

The pixel defect correction portion 24 corrects a pixel signal of an object pixel which is the defect pixel in an image obtained by shooting based on a pixel signal of a pixel handled as the same color as the object pixel and in the neighborhood of the object pixel. More specifically, the pixel defect correction portion 24 according to this embodiment executes processing of calculating a correction value based on a pixel signal of a pixel of the same color positioned on the upper and lower side as well as at the right and left of the defect pixel or a pixel signal of a pixel of the same color positioned at the right and left, and replacing a signal value of the pixel signal of the defect pixel with the calculated correction value.

The above-described pixel defect detection/correction portion 20 preferably houses a line buffer of about one to several lines and stores a pixel signal outputted from the image pickup portion 10 in this line buffer to execute approximately real-time processing. However, not limited to this, it is also acceptable that the pixel signal outputted from the image pickup portion 10 is once stored in the internal memory 3, and the pixel signal is read from the internal memory 3 for processing.

An image pickup signal constituted by the image signal on which the defect pixel is corrected by the pixel defect detection/correction portion 20 passes through the bus 2, and is stored in the internal memory 3, for example.

A bus 2 is a transfer route which transfers various data or a control signal generated at a certain place in the image pickup apparatus 1 to other places in the image pickup apparatus 1. The bus 2 according to this embodiment is connected to the image pickup portion 10, the pixel defect detection/correction portion 20 including the pixel defect detection portion 21, the pixel defect order setting portion 22, the pixel defect registration portion 23 and the pixel defect correction portion 24, the image processing portion 30 including an image analysis portion 31, an image correction portion 32 and a development processing portion 33, the internal memory 3, the external memory 4, the display portion 5, the input IF 6, the touch panel 7, the battery 8 and the system control portion 9.

The internal memory 3 is a storing portion including a volatile memory such as a DRAM (dynamic random access memory) and a non-volatile memory such as an EEPROM (electrically erasable programmable read-only memory).

The volatile memory temporarily stores various data such as the pixel signal outputted from the image pickup portion 10, the pixel signal subjected to defect correction in the pixel defect detection/correction portion 20 and a pixel signal processed in the image processing portion 30, etc.

The non-volatile memory stores a processing program executed by the system control portion 9, and various kinds of setting values or parameters used for executing the processing program, for example. Here, the information to be stored in the non-volatile memory includes the information of the defect pixel at the time of manufacturing and the information of the defect pixel generated after the manufacturing as described above. In this way, the internal memory 3 associates and stores the position of the defect pixel and the order of the defect pixel.

The image processing portion 30 executes image processing to the image pickup signal constituted by the pixel signal on which the defect pixel is corrected by the pixel defect detection/correction portion 20 to generate an image signal. More specifically, the image processing portion 30 includes the image analysis portion 31, the image correction portion 32 and the development processing portion 33.

The image analysis portion 31, for example, calculates the OB level based on the pixel signal outputted from the OB pixel area of the image sensor 15. Also, the image analysis portion 31 may execute edge detection or depth detection of an image, etc., and other image analyses may be executed.

The image correction portion 32, for example, executes correction of subtracting the OB level calculated by the image analysis portion 31 from the pixel signal outputted from the normal pixel area of the image sensor 15.

The development processing portion 33 executes various kinds of image processing which are so-called as development processing such as white balance processing, demosaicking processing, noise reduction processing, color conversion processing, gamma conversion processing and scaling processing to the pixel signal corrected by the image correction portion 32 to generate an image signal.

The external memory 4 is a recording medium which records the image signal processed by the image processing portion 30 as non-volatile, and is configured by a memory card which is attachable and detachable to and from the image pickup apparatus 1, for example. Accordingly, the external memory 4 is not necessarily a configuration inherent to the image pickup apparatus 1.

The display portion 5 is a display device configured using an LCD (liquid crystal display) and an organic light emitting diode, etc. The display portion 5 displays an image based on the image signal generated by the image processing portion 30, and displays various kinds of information relating to the image pickup apparatus 1.

In this way, the image signal to be recorded in the external memory 4 and the image signal used for display by the display portion 5 are image signals in which correction of the defect pixel which increases chronologically is executed appropriately.

The input IF 6 is an operation portion (operation device) configured to execute various operation inputs to the image pickup apparatus 1 by a user. The input IF 6 includes a power button configured to power up/down the image pickup apparatus 1, a release button configured to direct shooting of an image, a replay button configured to execute replay of a recorded image, a menu bottom configured to execute setting of the image pickup apparatus 1, etc. and operation buttons such as a D-pad used for selecting operation of items and an OK button used for settling operation of a selected item, etc.

Here, items which can be set using the menu button, the D-pad and the OK button, etc. include a shooting mode (a still image shooting mode, a video shooting mode, etc.), a recording mode, a replay mode and a pixel defect detecting mode, etc. When an operation is executed to the input IF 6, a signal corresponding to the operation content passes through the bus 2 and is transmitted to the system control portion 9.

The touch panel 7 is an operation portion (operation device) provided as an input interface independent of the above-described buttons, and includes a transparent sheet-like touch position inputting device located on a display surface of the display portion 5. Also, by operating the touch panel 7, substantially the same operation as the operation of the input IF 6 described above can be executed. Moreover, by operating the touch panel 7, enlarging, contracting or scrolling, etc. of the image can be easily performed.

The battery 8 is an electric power source in the portable image pickup apparatus 1. The power generated by the battery 8 is supplied to each portion of the image pickup apparatus 1.

The system control portion 9 is configured by a processor such as a CPU, and is a control circuit for overall control of each portion of the image pickup apparatus 1. When the operation input is executed by the user from the input IF 6 or the touch panel 7, the system control portion 9 analyzes the inputted information, and reads in a parameter necessary for processing from the internal memory 3 in accordance with a processing program recorded in the internal memory 3, and then executes various sequences in accordance with the operation content while performing various kinds of calculation processing, etc.

Also, the system control portion 9 controls the image pickup portion 10. The system control portion 9 executes focal adjustment of the lens 12, and when the lens 12 is an electric zoom lens, also executes zoom adjustment. Moreover, the system control portion 9 controls the aperture 13 based on a set aperture value, and controls the mechanical shutter 14 or the electronic shutter by the image sensor 15 based on a set exposure time (shutter speed). Further, the system control portion 9 outputs a clock signal and a control signal to the image sensor 15 to control an image pickup operation by the image sensor 15.

Note that, in this embodiment, to the pixel signal outputted from the image sensor 15 having the plurality of pixels including the defect pixel, the defect pixel correction apparatus which corrects the pixel signal of the defected pixel includes, for example, following each portion. In other words, the defect pixel correction apparatus is configured to include, for example, the pixel defect detection/correction portion 20, the internal memory 3, the input IF 6 as well as the touch panel 7 as the operation portion, the system control portion 9 configured to control the pixel defect detection/correction portion 20 and the internal memory 3 in accordance with the input from the input IF 6 as well as the touch panel 7 and the bus 2 configured to connect the pixel defect detection/correction portion 20, the internal memory 3, the input IF 6, the touch panel 7 and the system control portion 9.

Next, the information of the defect pixel will be explained. As described before, the information of the defect pixel includes the position of the defect pixel and the defect attribute of the defect pixel.

Figure 3:
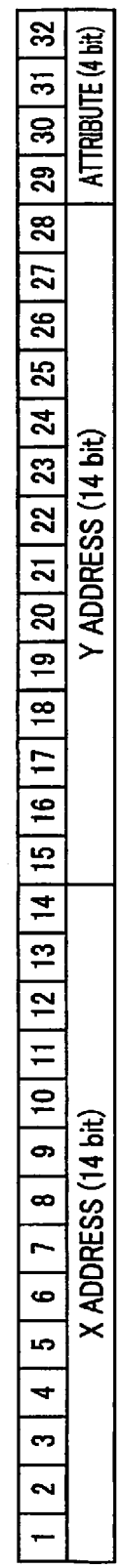
FIG. 3 is a diagram showing an example of the pixel defect information stored in an internal memory in the first embodiment.

FIG. 3 is a diagram showing an example of the pixel defect information stored in the internal memory 3.

FIG. 3 is the example in which the information of one defect pixel is represented in 32 bit (4 bytes).

First, in the example shown in FIG. 3, the defect attribute is shown in 4 bit.

Moreover, the remained (32−4)=28 bits are used for storing the information showing the position of the defect pixel in the pixel area of the image sensor 15 in which pixels are arranged in the X direction and the Y direction.

FIG. 3 shows the example in which the position of the defect pixel in the X direction and the Y direction is represented as 14-bit X address and 14-bit Y address. In this case, the address of approximately horizontally 16,000× vertically 16,000 pixels can be represented.

The number of bits of the X address and the Y address of the pixel defect information shown in FIG. 3 may be changed in accordance with the number of pixels and an aspect ratio, etc. of the image sensor 15.

Note that when more information is stored, for example, when more information is stored as the defect attribute, when more information other than the defect attribute is further stored, or when the number of pixels of the image sensor 15 is greater, the pixel defect information may be represented in 5 bytes or more, for example 64 bits (8 bytes).

Pixel defect detection is executed to the image pickup apparatus 1 as one of tests at the time of factory shipment. When the pixel defect is detected, after a specified shooting condition (the exposure time (shutter speed), ISO sensitivity, an aperture value of the aperture 13) is set, a specified object, for example, at least one of an object with a uniform brightness and a dark object in a state that the mechanical shutter 14 is closed (preferably both) is shot by the image sensor 15 to obtain at least one of a bright image and a dark image (preferably both).

A pixel signal related to the bright image or the dark image obtained by the image sensor 15 is sent to the pixel defect detection/correction portion 20.

In the pixel defect detection portion 21, an arbitrary threshold is set for each image. For example, for the bright image, a threshold in accordance with brightness of the object is set, and for the dark image, a threshold for a dark time is set. The pixel defect detection portion 21 determines whether each pixel configuring the image is the defect pixel by comparing a signal value of the pixel signal received from the image sensor 15 with the threshold.

For example, in the bright image, a pixel with a signal value lower than the set threshold is determined as a pixel of a bright pixel defect (a pixel having a lower signal value than a signal value of the normal pixel).

Also, in the dark image, a pixel with a signal value higher than the threshold for a dark time is determined as a pixel of a dark pixel defect (a pixel having a higher signal value than a signal value of the normal pixel).

Further, the pixel defect detection portion 21 not only determines whether the bright pixel defect or the dark pixel defect is generated, but also determines a defect level showing the degree of defect. That is, the pixel defect detection portion 21 determines that, depending on how a signal value is deviated from the threshold, a defect level is high when the degree of deviation is high, and a defect level is low when the degree of deviation is low. Moreover, the pixel defect detection portion 21 applies the defect levels of A, B, C . . . , for example, sequentially from the high defect level to the low defect level.

Accordingly, the defect pixel is differentiated as a dark A defect or a bright B defect, for example, depending on whether the shooting condition is a bright shooting or a dark shooting as well as on the defect level.

In addition to the fact that the pixel defect detection is executed at the time of factory shipment, the pixel defect detection can be executed when the user sets the pixel defect detection mode at an arbitrary time point after the factory shipment. However, the setting of the pixel defect detection mode is not limited to be manually executed. For example, the pixel defect detection mode may be automatically set for each time when the number of shooting photos reaches a fixed number, the pixel defect detection mode may be automatically set for each time when an elapsed time from the manufacturing reaches a fixed time or the pixel defect detection mode may be automatically set in accordance with other parameters.

In this embodiment, the pixel defect detected at the time of factory shipment is defined as an advanced pixel defect, and the pixel defect detected after the factory shipment is defined as a delayed pixel defect.

When the user executes the pixel defect detection, preparing the object with uniform brightness is difficult, so that in detection of the delayed pixel defect, the image sensor 15 obtains the dark image in a state that the mechanical shutter 14 is closed and the image sensor 15 is light-blocked to detect the dark pixel defect. In other words, while the delayed pixel defect is assumed to be the dark pixel defect in this embodiment, the delayed pixel defect is not limited to the dark pixel defect. For example, the bright pixel defect as the delayed pixel defect may be detected by shooting a wholly white paper as the object.

Further, an adaptive defect can be listed as another pixel defect. The adaptive defect is not a stationary pixel defect, but the pixel defect which occurs at random timing (for example, the pixel defect occurring in only one image among 100 shot images). The adaptive defect is adaptively detected from a shooting image which is different from both of the bright image and the dark image. More specifically, the pixel defect detection portion 21 focuses on one pixel in the shooting image and compares a signal value of the focused pixel with a signal value of a pixel surrounding the focused pixel (for example, an average of signal values of pixels having the same color surrounding the focused pixel). When the deviation of the signal values is larger than an adaptively set threshold, the focused pixel is determined as the adaptive defect.

The adaptive defect is also called as a blinking defect since the adaptive defect occurs at random timing. In contrast to this, other defects than the adaptive defect occurring constantly are called as a stationary defect. Accordingly, the adaptive defect is not usually detected in a test at the time of manufacturing, and even when the adaptive defect is detected in a test at any time point after the manufacturing, this defect may not be detected in a test at a different time point subsequently.

As descried above, defect attribute showing the kind of the advanced pixel defect, the delayed pixel defect and the adaptive defect which are detected is recorded as non-volatile attribute in the internal memory 3 by the pixel defect registration portion 23 for registration together with the information showing the position of the defect pixel as shown in FIG. 3.

Note that the delayed pixel defect and the adaptive defect may be not only newly generated at a pixel position which is different from a pixel position of the advanced pixel defect, but also generated at the same pixel position as the pixel position of the advanced pixel defect with a different defect level. Accordingly, when information of a plurality of pixel defects is registered at the same pixel position, the pixel defect correction portion 24 refers to the order which will be described later and uses the pixel defect information with the highest order as the pixel defect information of the corresponding pixel position.

The internal memory 3 stores the association between the position of the defect pixel and the order of the pixel defect with classification of a first association to a long exposure time and a second association to a short exposure time.

In other words, the internal memory 3 further stores the information showing the relationship between the defect attribute and the order set by the pixel defect order setting portion 22 as a table shown in FIG. 10 or 11, for example. Here, an example in which the table shown in FIG. 10 or 11 is stored in the internal memory 3 will be explained. However, the table may be stored as a non-volatile table in a not shown memory in the pixel defect detection/correction portion 20, and arrangement of the memory which stores the table is not limited to a specified position.

FIG. 10 is a table showing an example of order setting of the defect pixel in a long exposure time. FIG. 11 is a table showing an example of order setting of the defect pixel in a short exposure time.

Here, the long exposure time is an exposure time which is longer than a threshold time, and is appropriately abbreviated as long second. Also, the short exposure time is an exposure time which is the threshold time or less, and is appropriately abbreviated as short second. While the threshold time may be a fixed value, an adaptively determined value is also acceptable. An example of adaptively determining a value of the threshold time will be explained later with reference to FIG. 12.

The information of defect attribute associated with the kind of defect (defect kind) is the same between a case shown in FIG. 10 and a case shown in FIG. 11.

In other words, an advanced dark A defect, a delayed dark A defect, an advanced bright A defect, an advanced dark B defect, a delayed dark B defect, an advanced bright B defect, an advance dark C defect and the adaptive defect are respectively associated with digital values 1, 2, 3, 4, 5, 6, 7 and 8 showing the defect attribute (note that digital values of 9 or more may be associated with other defect kinds although these cases are omitted). Accordingly, in the pixel defect information shown in FIG. 3, the defect pixel with a 4-bit attribute value of 1, for example, corresponds to the advanced dark A defect as the kind of defect.

In the columns of long second/short second of FIGS. 10 and 11, whether the image to be processed is obtained by an exposure with the long exposure time or an exposure with the short exposure time is shown with 1-bit data. FIG. 10 is a table in the long exposure time (long second), so that 1 is applied as a bit value in the column of long second/short second, while FIG. 11 is a table in the short exposure time (short second), so that 0 is applied as a bit value in the column of long second/short second. Accordingly, the column of long second/short second is a flag showing that the image to be processed is the image obtained by the exposure with the long exposure time (if the bit value is 1, that is, the flag is on, the image is obtained by the exposure with the long exposure time).

The pixel defect includes the pixel defect which occurs only in the image with the long exposure time (that is, when the image with the short exposure time is used, this image does not need to be handled as the pixel defect and may be handled as the normal pixel) (the advanced dark C defect in the concrete examples in FIGS. 10 and 11). The advanced dark C defect, for example, has a signal value which becomes larger as an exposure time increases, and when the exposure time is longer than the threshold time, this defect can be recognized as the pixel defect.

Accordingly, valid setting as 1-bit information which shows whether the order setting of the defect pixel is valid is provided.

As shown in FIG. 10, in the long exposure time (a bit value of long second/short second is 1), the valid settings of all the advanced dark A defect, the delayed dark A defect, the advanced bright A defect, the advanced dark B defect, the delayed dark B defect, the advanced bright B defect, the advance dark C defect and the adaptive defect are on, and 1 is applied as a bit value of the valid setting. Accordingly, the order of all the defect pixels is considered.

On the other hand, as shown in FIG. 11, in the short exposure time (a bit value of long second/short second is 0), the valid settings of the advanced dark A defect, the delayed dark A defect, the advanced bright A defect, the advanced dark B defect, the delayed dark B defect, the advanced bright B defect and the adaptive defect are on, and 1 is applied as the bit value of the valid setting. However, the valid setting of the advance dark C defect is off, and 0 is applied as the bit value of the valid setting. Consequently, in the short exposure time, the advanced dark C defect is not an object for order consideration, and handled as the normal pixel. In this way, the valid setting is a flag showing that the order setting associated with the defect attribute is valid (if the bit value is 1, the order setting is valid).

Also, when calculation is executed in a logic circuit, a result of taking AND of a bit value of the valid setting and a bit value of the order setting can be used as a valid order setting, which makes arithmetic processing easy.

The order setting is 4-bit data, for example. In the relationship between the defect attribute and the order, the order 1 is set to the advanced dark A defect, the delayed dark A defect and the advanced bright A defect, the order 2 is set to the advanced dark B defect and the delayed dark B defect, the order 3 is set to the advanced bright B defect, the order 4 is set to the advanced dark C defect and the order 5 is set to the adaptive defect, respectively. Here, the order is expressed as a positive integer value which increases serially from a start point of 1, showing that a smaller value has a higher order, and a larger value has a lower order. Accordingly, listing a concrete example, the order 1 is higher than the order 2, and the order 2 is higher than the order 3.

In the example of tables shown in FIGS. 10 and 11, the order associated with the defect attribute is the same in the long exposure time and the short exposure time. However, the order is not limited to this. For example, in a certain defect kind, a signal value increases as the exposure time becomes longer, while in another defect kind, a constant signal value is always outputted regardless of the length of the exposure time. In such a case, the order associated with the defect attribute may be changed in the long exposure time and the short exposure time.

In the above description, the example of the valid setting and the order setting in accordance with the length of the exposure time has been explained. However, not limited to this example, the valid setting and the order setting in accordance with other shooting conditions may be set, or the valid setting and the order setting in accordance with a combination result of a plurality of shooting conditions may be set.

Such adaptive change of the valid setting and the order setting associated with the defect attribute in accordance with the shooting condition is executed by the pixel defect order setting portion 22.

In this way, when a pixel position of any pixel matches a pixel position of the defect pixel registered in the internal memory 3, the pixel defect correction portion 24 reads in the attribute shown in FIG. 3 and refers to the table of FIG. 10 or 11 based on the read attribute, so that the order of the corresponding pixel can be read.

When the pixel defect correction portion 24 reads the order of the pixel, if there are a plurality of pixel positions of the defect pixel registered to the same pixel position, as described above, the highest order is regarded as the order of the corresponding pixel.

More specifically, for example, if a certain pixel has been an advanced pixel defect with the order 4, and then becomes a delayed pixel defect with the order 2, the pixel defect correction portion 24 reads the order of the corresponding pixel as 2. Note that, in this case, as described above, the order classified in the long exposure time and the short exposure time is applied.

In this way, the internal memory 3 stores the defect attribute of the defect pixel associated with the position of the defect pixel (FIG. 3) and stores the order associated with the defect attribute (FIGS. 10 and 11), so that the position of the defect pixel and the order of the defect pixel are associated through the defect attribute of the defect pixel. Due to such handling, the order to be associated with the defect attribute can be easily and adaptively changed as described above.

Figure 4:
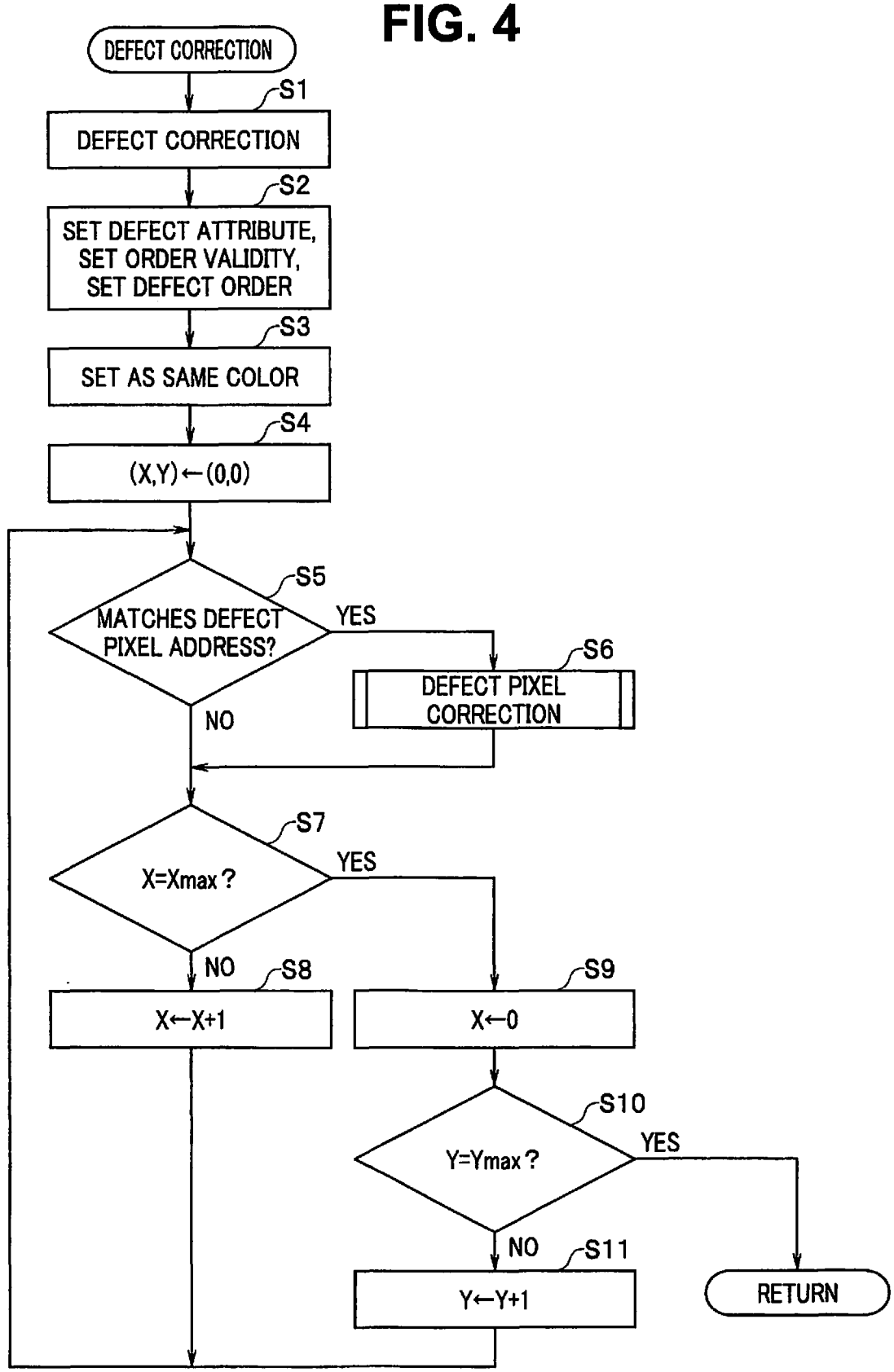
FIG. 4 is a flowchart showing defect correction processing of the image pickup apparatus including the defect pixel correction apparatus of the first embodiment.

FIG. 4 is a flowchart showing defect correction processing of the image pickup apparatus 1 including the defect pixel correction apparatus.

When it goes to this defect correction processing from a not shown main processing, the pixel defect correction portion 24 reads in the shooting condition in obtaining the shooting image by the image sensor 15 from the system control portion 9, for example (step S1). Here, as the shooting condition, for example, the ISO sensitivity and the exposure time are read in.

Figure 12:
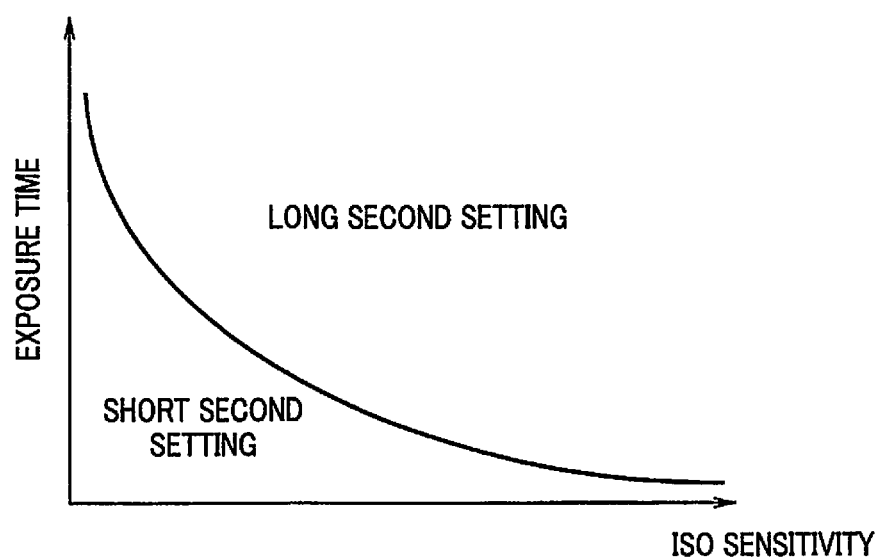
FIG. 12 is a graph showing an example in which a threshold time to differentiate the long exposure time from the short exposure time is changed in accordance with ISO sensitivity setting at the time of shooting in the first embodiment.

FIG. 12 is a graph showing an example in which the threshold time to differentiate the long exposure time from the short exposure time is changed in accordance with ISO sensitivity setting at the time of shooting.

The graph shown in FIG. 12 is stored in, for example, the non-volatile memory in the internal memory 3 or a not shown non-volatile memory in the pixel defect detection/correction portion 20. Here, the change of the threshold time in accordance with the ISO sensitivity setting is not limited to be stored as a graph. For example, the exposure time corresponding to several ISO sensitivities is stored as a table, and when the ISO sensitivity which is not present in the table is set, interpolation, etc. may be executed to calculate the exposure time corresponding to the set ISO sensitivity. Alternatively, a mathematical expression corresponding to the graph may be stored.

This processing shown in FIG. 12 may be omitted. However, in a case of execution, the pixel defect correction portion 24 sets the threshold time such that, depending on the matter that the ISO sensitivity applied to the pixel signal outputted from the image sensor 15 is any of a first ISO sensitivity and a second ISO sensitivity which is higher than the first ISO sensitivity, the threshold time is shorter in the second ISO sensitivity than in the first ISO sensitivity. Moreover, the pixel defect correction portion 24 determines whether the read exposure time is not lower than the threshold time or less than the threshold time in the set ISO sensitivity in accordance with the graph of FIG. 12.

Here, when the read exposure time is determined as not lower than the threshold time, the table for the long exposure time as shown in FIG. 10 is read from the internal memory 3, while the read exposure time is determined as less than the threshold time, the table for the short exposure time as shown in FIG. 11 is read from the internal memory 3.

Accordingly, the pixel defect correction portion 24 applies the order based on the first association as shown in FIG. 10 when the exposure time when the image sensor 15 generates the pixel signal is not lower than the threshold time, and applies the order based on the second association as shown in FIG. 11 when the exposure time is less than the threshold time.

Since the image pickup signal outputted from the image sensor 15 is subjected to signal amplification in accordance with the set ISO sensitivity, a signal value of the defected pixel is subjected to signal amplification in accordance with the ISO sensitivity. In other words, since a defect level of the pixel is changed in accordance with the set ISO sensitivity, as shown in FIG. 12 for example, the threshold time is changed in accordance with the ISO sensitivity.

Here, while the ISO sensitivity is listed as an example, the threshold time may be changed in accordance with other parameters which change a defect level of the defect pixel (for example, the temperature of the image sensor 15, an exposure correction value, a white balance and a gamma conversion curve, etc.)

Moreover, based on the read table, defect attribute showing the kind of a defect, the order of the defect and validity/invalidity of the order are respectively set (step S2).

Further, setting is executed as to whether defect correction is executed handling Gr and Gb as the same color or defect correction is executed handling Gr and Gb only as different colors (step S3). This setting is executed by the operation input by the user or based on automatic setting as will be described later.

After that, (0, 0) is set as an initial value of a (X, Y) address showing a pixel position (step S4). Here, the (X, Y) addresses which can be taken are assumed as (0, 0) to (Xmax, Ymax). Xmax represents the number of pixels of one line in the image sensor 15, and Ymax represents the number of all lines in the image sensor 15.

Next, it is determined whether the currently set (X, Y) address matches an address of the defect pixel registered in the internal memory 3 as shown in FIG. 3 (step S5).

Figure 5:
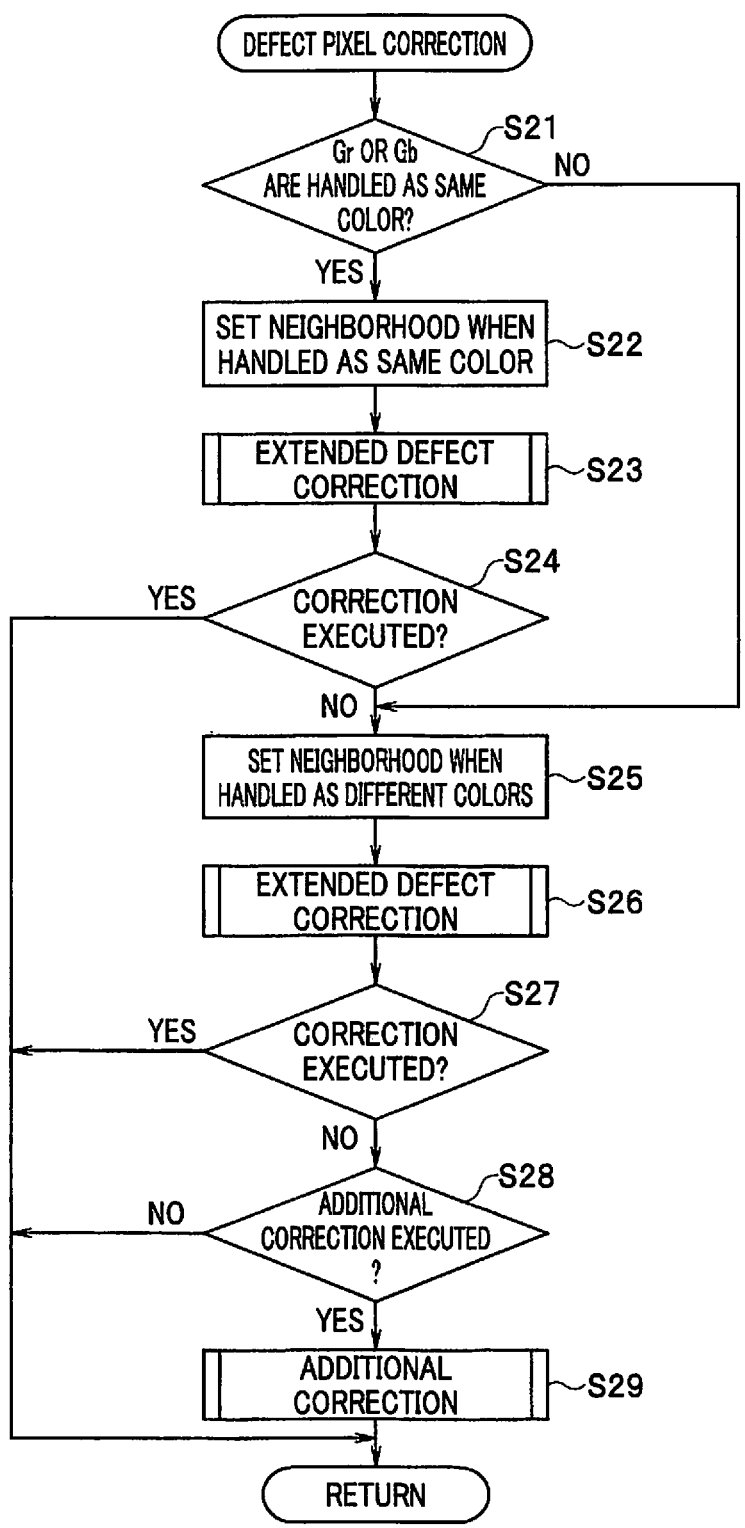
FIG. 5 is a flowchart showing the detail of defect pixel correction processing in step S6 of FIG. 4 in the first embodiment.

Here, in the case of a match, to a pixel signal read from a pixel of the (X, Y) address, defect pixel correction processing as explained with reference to FIG. 5 is executed (step S6).

When the processing of step S6 is executed or it is determined that there is no match in step S5, the pixel defect correction portion 24 determines whether X reaches the number of pixels Xmax of one line (step S7).

Here, when it is determined that X does not reach Xmax, after X is incremented (step S8), it returns to step S5 to execute processing to the next pixel.

Also, when it is determined that X reaches Xmax in step S7, X is reset to 0 (step S9), and whether Y reaches the number of all lines Ymax is determined (step S10).

Here, when it is determined that Y does not reach Ymax, after Y is incremented (step S11), it returns to step S5 to execute processing to the first pixel of the next line.

In this way, when it is determined that Y reaches Ymax in step S10, it returns to the not shown main processing from this processing.

FIG. 5 is a flowchart showing the detail of the defect pixel correction processing in step S6 of FIG. 4.

When this process is started, the pixel defect correction portion 24 determines whether the object pixel for defect correction is any of the Gr pixel and the Gb pixel and setting in which Gr and Gb are handled as the same color is executed (step S21).

Here, setting in which Gr and Gb are handled as the same color can be selected in accordance with the operation input by the user from the operation portion. Also, when the user provides no operation input, a previously set initial selection value is set.

Note that, in a case where Gr and Gb are handled as different colors in or after step S25 which will be described later, the same processing can be applied to R, Gr, B and Gb. On the other hand, processing of handling Gr and Gb as the same color is applied to only Gr and Gb, and this processing is not applied to R and B. Accordingly, processing becomes complex when Gr and Gb are handled as the same color, which requires complication and scaling up (or increase of a processing load, the same is applied hereinafter) of a system. Consequently, to prevent complication and scaling up, here, processing of handling as the same color can be on/off.

When the condition of step S21 is established, the pixel defect correction portion 24 sets a neighborhood when Gr and Gb are handled as the same color (step S22).

The neighborhood which is set when Gr and Gb are handled as the same color will be concretely explained listing a pixel arrangement shown in FIG. 21 as an example. Here, FIG. 21 is a table showing a correction example in a case where the normal pixel and the defect pixel are located in the neighborhood when the Gr pixel and the Gb pixel are handled as the same color.

In the pixel arrangement shown in FIG. 21, the object pixel for defect correction is assumed as Gr0 of the green pixel, for example. In such a case, the same color pixels located nearest to Gr0 are four Gb pixels located adjacently to Gr0 in four diagonal directions, which are, Gb1 on the upper right, Gb2 on the upper left, Gb3 on the lower left and Gb4 on the lower right. The pixel defect correction portion 24 sets these Gb1, Gb2, Gb3 and Gb4 as the neighborhood. Note that when the object pixel is the Gb pixel, in the same manner, the pixel defect correction portion 24 sets four Gr pixels located adjacently to the object pixel in four diagonal directions as the neighborhood.

Based on the set neighborhood, the pixel defect correction portion 24 executes extended defect correction processing as will be explained with reference to FIG. 6 (step S23).

In this way, the pixel defect correction portion 24 can select processing with the handling as the same color in which the pixel signal of the object pixel is corrected by handling the Gr pixel and the Gb pixel as the same color through processing of step S22 and step S23 before the pixel signal of the object pixel is corrected by handling the Gr pixel and the Gb pixel as different colors through processing of step S25 and the subsequent steps which will be described later.

The pixel defect correction portion 24 determines whether the extended defect correction of step S23 is executed (step S24).

Here, when it is determined that no correction is executed or when it is determined that, in step S21, the object pixel is neither the Gr pixel nor the Gb pixel or, even if the object pixel is any of the Gr pixel and the Gb pixel, setting of handling Gr and Gb as the same color is not executed, the following processing is executed.

In other words, the pixel defect correction portion 24 sets the neighborhood when the Gr pixel and the Gb pixels are handled as different colors, that is, when each of the R pixel, the Gr pixel, the B pixel and the Gb pixel is handled as different colors (step S25). When the Gr pixel and the Gb pixel are handled as different colors, to any of R, Gr, Gb and B, an arrangement of the set adjacent pixels to the object pixel is the same.

First, it is assumed that the pixel defect correction portion 24 in this embodiment can select between one-dimensional correction of correcting the pixel signal of the object pixel based on a pixel signal of a pixel located on a line where the object pixel is arranged and two-dimensional correction of correcting the pixel signal of the object pixel based on pixel signals of pixels located on a plurality of lines including a line adjacent to the line where the object pixel is arranged.

More specifically, the pixel defect correction portion 24 can select executing the one-dimensional correction of the defect pixel based on buffer data of one line or executing the two-dimensional correction of the defect pixel based on buffer data of five lines, for example. Here, whether the one-dimensional correction should be selected or the two-dimensional correction should be selected is appropriately determined in accordance with a processing speed of the defect pixel correction apparatus (or the image pickup apparatus 1 including the defect pixel correction apparatus) or in accordance with the shooting image which can be obtained depending on the object.

A concrete explanation will be made listing a pixel arrangement shown in FIG. 9 as an example. Here, FIG. 9 is a table showing a general correction example when the normal pixel is located at the periphery of the object pixel for correction.

In the pixel arrangement shown in FIG. 9, when it is assumed that the object pixel is R0 of the red pixel for example, when the one-dimensional correction is executed, a nearest same color pixel R5 on a left side and a nearest same color pixel R1 on a right side on the same line are set as one-dimensional neighborhood. Also, when the two-dimensional correction is executed, in addition to R1 and R5, a nearest same color pixel R3 on an upper side and a nearest same color pixel R7 on a lower side are further set as two-dimensional neighborhood. Additionally, in any case where the object pixel is Gr, Gb or B, the neighborhood can be set in the same manner as R.

And, based on the set neighborhood, the pixel defect correction portion 24 executes the extended defect correction processing as will be explained with reference to FIG. 6 (step S26).

After that, the pixel defect correction portion 24 determines whether the extended defect correction of step S26 is executed (step S27).

Here, when it is determined that the correction is not executed, the pixel defect correction portion 24 determines whether additional correction should be executed depending on whether setting for executing the additional correction is further executed (step S28).

Here, the setting for executing the additional correction can be selected in accordance with the operation input by the user from the operation portion. Also, when no operation input is made by the user, the previously set initial selection value is set.

The reason why change-over of whether the additional correction should be executed is provided here is that, there is a case where, when defect correction of the object pixel is executed using a pixel signal of a pixel with a far spatial distance from the object pixel, although correction is executed expecting improvement of image quality, image quality could be deteriorated on the contrary. As an example of the object in which image quality could be lowered by correction, the object having a low spatial correlation, for example, the object which is not flat and has a high spatial frequency can be listed.

When it is determined that the additional correction is executed in step S28, the pixel defect correction portion 24 executes the additional correction as will be explained with reference to FIG. 7 (step S29).

In this way, when processing of step S29 is executed, when it is determined that the correction is executed in step S24 or step S27, or when it is determined that no additional correction is executed in step S28, it returns to processing shown in FIG. 4 from this processing.

When it is determined that no additional correction is executed in step S28, the object pixel remains uncorrected.

Figure 6:
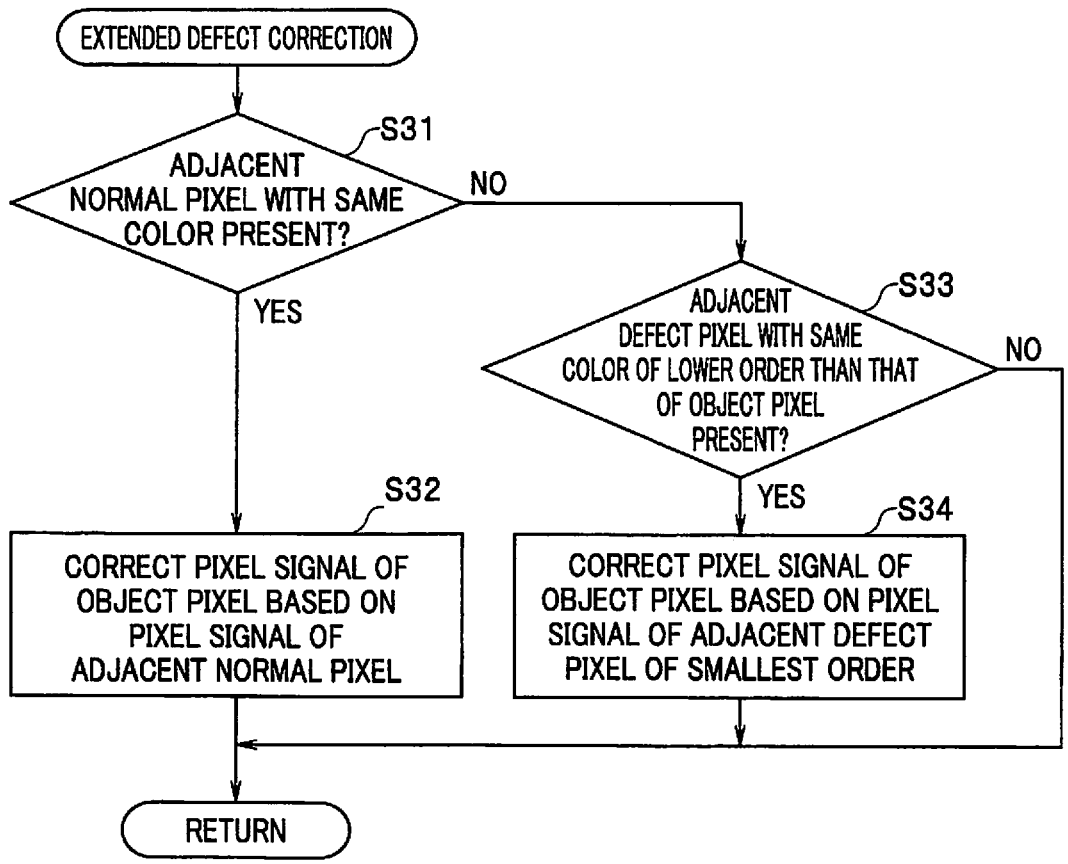
FIG. 6 is a flowchart showing the detail of extended defect correction processing in step S23 and step S26 in FIG. 5 and step S43 in FIG. 7 in the first embodiment.
Figure 7:
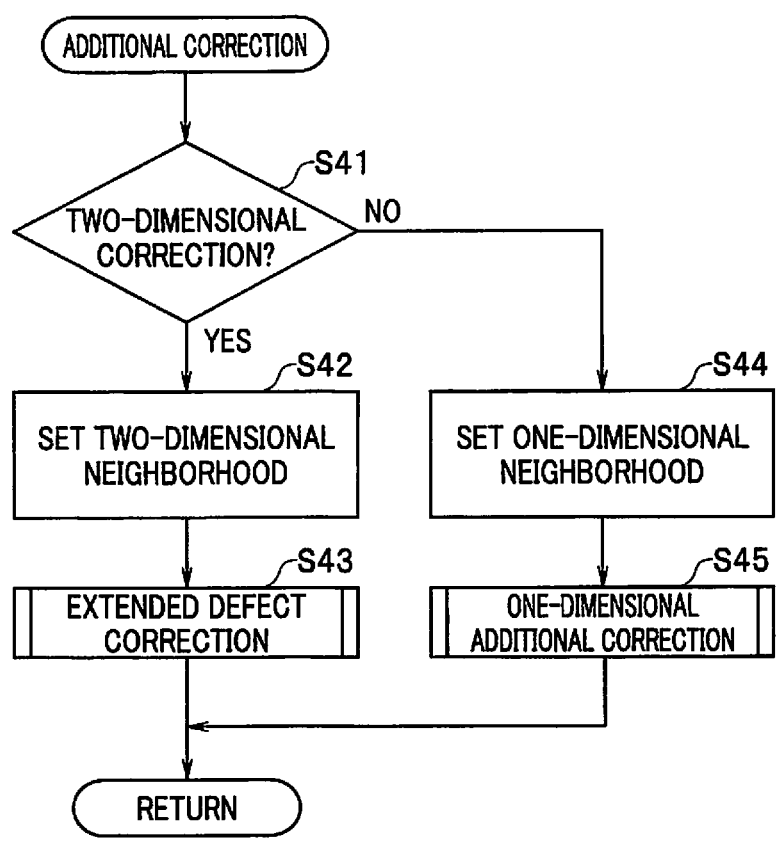
FIG. 7 is a flowchart showing the detail of additional correction processing in step S29 of FIG. 5 in the first embodiment.

FIG. 6 is a flowchart showing the detail of the extended defect correction processing in step S23 and step S26 in FIG. 5 and step S43 in FIG. 7.

First, here, the extended defect correction processing to be executed in step S23 and step S26 of FIG. 5 will be explained.

The pixel defect correction portion 24 executes setting of neighborhood to the object pixel which is the defect pixel in step S22 or step S25 in FIG. 5. In the neighborhood set here, the normal pixel is defined as an adjacent normal pixel, and the defect pixel is defined as an adjacent defect pixel. At this time, when the adjacent normal pixel is present, the pixel defect correction portion 24 corrects the pixel signal of the object pixel based on a pixel signal of the adjacent normal pixel. And, when no adjacent normal pixel is present and the adjacent defect pixel of a lower order than the order of the object pixel is present, the pixel defect correction portion 24 corrects the pixel signal of the object pixel based on a pixel signal of the adjacent defect pixel having the lowest order.

In other words, when the processing is started, the pixel defect correction portion 24 determines whether the adjacent normal pixel having the same color is present in the neighborhood set to the object pixel (step S31).

Here, when it is determined that the adjacent normal pixel having the same color is present, the pixel signal of the object pixel is corrected based on the pixel signal of the adjacent normal pixel (step S32).

For example, column A of FIG. 9 show an example in which the set adjacent pixels in step S25 are the normal pixels.

When the one-dimensional correction is executed in the example shown in the column A of FIG. 9, since R1 and R5 are the normal pixels, the correction is executed by replacing a pixel signal R0 of the object pixel R0 (For easy notation, a symbol representing a pixel is the same as a symbol representing the corresponding pixel signal. The same is applied hereinafter.) with (R1+R5)/2 calculated based on a pixel signal R1 and a pixel signal R5 (step S32 which is executed in step S26).

On the other hand, when the two-dimensional correction is executed in the example shown in the column A of FIG. 9, since R1, R3, R5 and R7 are the normal pixels, the correction is executed by replacing the pixel signal R0 with (R1+R3+R5+R7)/4 calculated based on the pixel signal R1, a pixel signal R3, the pixel signal R5 and a pixel signal R7 (step S32 which is executed in step S26). Note that, all correction values shown in the column A of FIG. 9 are an average of the normal pixel signals having the same color in the neighborhood of the object pixel R0.

Also, column B of FIG. 9 show an example in which R5 is the defect pixel, not the normal pixel. In such a case, when the one-dimensional correction is executed, the correction is executed by replacing the pixel signal R0 with the pixel signal R1 (step S32 which is executed in step S26). Also, when the two-dimensional correction is executed, the correction is executed by replacing the pixel signal R0 with (R1+R3+R7)/3 (step S32 which is executed in step S26). Accordingly, all correction values shown in the column B of FIG. 9 are an average of the normal pixel signals having the same color in the neighborhood of the object pixel R0 excluding the defect pixel.

The image sensor 15 in which the defect pixels are present intensively at a specified portion is excluded in the test, so that this image sensor is not mounted to a product. Consequently, in the image sensor 15 with little time elapsed after factory shipment, the defect pixels are not present intensively, and it is all right to execute processing of the defect correction as explained with reference to FIG. 9 based on the registered pixel defect information (information of the advanced pixel defect) detected in the test at the time of factory shipment.

However, the image sensor 15 has a property that the delayed pixel defect increases over time. In other words, in addition to the advanced pixel defect at the time of factory shipment, the delayed pixel defect which is detected and registered after factory shipment and the adaptive defect are generated, so that the number of the pixel defect registrations related to the image sensor 15 increases chronologically.

As a result of this, as in the column B in FIG. 9, a case where a same-color pixel adjacent to a certain pixel defect becomes the defect pixel increases, and in some situations, a case occurs where all same-color pixels adjacent to a certain pixel defect in the upper, lower, right and left directions are occupied by the pixel defects having any attribute.

In this way, since a case where defect correction can be executed based on the adjacent defect pixel even when no adjacent normal pixel is present occurs, processing shown in FIG. 6 is called as the extended defect correction.

FIG. 13 is a table showing a correction example where the normal pixel and the defect pixel are present adjacent to the object pixel for correction. FIG. 13 shows an example where R3 is the defect pixel, not the normal pixel. In such a case, since the one-dimensional correction is not influenced, the one-dimensional correction is executed by replacing the pixel signal R0 with (R1+R5)/2 (step S32 which is executed in step S26). Also, when the two-dimensional correction is executed, the correction is executed by replacing the pixel signal R0 with (R1+R5+R7)/3 (step S32 which is executed in step S26).

FIG. 17 is a table showing a correction example where, in the short exposure time, a pixel to be handled as the normal pixel occurs in the neighborhood.

In the example shown in FIG. 17, the object pixel R0 has the attribute 1 and the order 1, the adjacent same color pixel R1 has the attribute 7 and the order 4, the adjacent same color pixel R3 has the attribute 8 and the order 5, the adjacent same color pixel R5 has the attribute 1 and the order 1 and the adjacent same color pixel R7 has the attribute 2 and the order 1.

However, as seen from FIG. 11, in the short exposure time, the defect pixel of the attribute 7 has the order which is set to invalid, so that this defect pixel is handled as the normal pixel. Accordingly, it is handled that the normal pixel is present in step S31 which is executed in step S26, so that in both cases where the one-dimensional correction is executed and where the two-dimensional correction is executed in step S32, the correction is executed by replacing the pixel signal R0 with the pixel signal R1.

FIG. 21 shows an example where Gb2 and Gb4 are the normal pixels, but Gb1 and Gb3 are the defect pixels, not the normal pixels. In such a case, the correction is executed by replacing the pixel signal Gr0 with (Gb2+Gb4)/2 (step S32 which is executed in step S23).

On the other hand, when it is determined that no adjacent normal pixel having the same color is present in step S31, the pixel defect correction portion 24 further determines whether the adjacent defect pixel having the same color of a lower order than the order of the object pixel is present (step S33).

Here, when it is determined that the adjacent defect pixel having the same color of a lower order than the order of the object pixel is present, the pixel signal of the object pixel is corrected based on the pixel signal of the adjacent defect pixel having the lowest order (step S34).

FIG. 14 is a table showing a correction example where, although no normal pixel is present in the neighborhood, one or more adjacent defect pixels having the lowest order which is the defect pixel of a lower order than the order of the object pixel for correction are present.

In the example shown in FIG. 14, the object pixel R0 has the attribute 1 and the order 1, the adjacent same color pixel R1 has the attribute 8 and the order 5, the adjacent same color pixel R3 has the attribute 8 and the order 5, the adjacent same color pixel R5 has the attribute 1 and the order 1 and the adjacent same color pixel R7 has the attribute 2 and the order 1.

In other words, the adjacent same color pixels R1 and R3 of a lower order than the order of the object pixel R0 are present, and these pixels have the order 5. Consequently, when the one-dimensional correction is executed, the correction is executed by replacing the pixel signal R0 with the pixel signal R1 (step S34 which is executed in step S26). Also, when the two-dimensional correction is executed, the correction is executed by replacing the pixel signal R0 with (R1+R3)/2 (step S34 which is executed in step S26).

FIG. 15 is a table showing a correction example where, although no normal pixel is present in the neighborhood, only one adjacent defect pixel having the lowest order which is the defect pixel of a lower order than the order of the object pixel for correction is present.

In the example shown in FIG. 15, the object pixel R0 has the attribute 1 and the order 1, the adjacent same color pixel R1 has the attribute 8 and the order 5, the adjacent same color pixel R3 has the attribute 6 and the order 3, the adjacent same color pixel R5 has the attribute 1 and the order 1 and the adjacent same color pixel R7 has the attribute 2 and the order 1.

In other words, although the adjacent same color pixels R1 and R3 of a lower order than the order of the object pixel R0 are present, the adjacent pixel with the lowest order is R1. Accordingly, in both cases where the one-dimensional correction is executed and where the two-dimensional correction is executed, the correction is executed by replacing the pixel signal R0 with the pixel signal R1 (step S34 which is executed in step S26).

FIG. 16 is a table showing a correction example where, in the long exposure time, although no normal pixel is present in the neighborhood, only one adjacent defect pixel having the lowest order which is the defect pixel of a lower order than the order of the object pixel for correction is present. While the above-described FIG. 17 is the example of the short exposure time, FIG. 16 is the example of the long exposure time which is different from FIG. 17.

In the example shown in FIG. 16, the object pixel R0 has the attribute 1 and the order 1, the adjacent same color pixel R1 has the attribute 8 and the order 5, the adjacent same color pixel R3 has the attribute 7 and the order 4, the adjacent same color pixel R5 has the attribute 1 and the order 1 and the adjacent same color pixel R7 has the attribute 2 and the order 1.

In other words, although the adjacent same color pixels R1 and R3 of a lower order than the order of the object pixel R0 are present, the adjacent pixel with the lowest order is R1. Accordingly, in both cases where the one-dimensional correction is executed and where the two-dimensional correction is executed, the correction is executed by replacing the pixel signal R0 with the pixel signal R1 (step S34 which is executed in step S26).

FIG. 22 is a table showing a correction example where, when the Gr pixel and the Gb pixel are handled as the same color, although no normal pixel is present in the neighborhood of the object pixel for correction, one or more adjacent defect pixels having the lowest order which is the defect pixel of a lower order than the order of the object pixel for correction are present.

In the example shown in FIG. 22, the object pixel Gr0 has the attribute 4 and the order 2, the adjacent same color pixel Gb1 has the attribute 5 and the order 2, the adjacent same color pixel Gb2 has the attribute 4 and the order 2, the adjacent same color pixel Gb3 has the attribute 7 and the order 4 and the adjacent same color pixel Gb4 has the attribute 7 and the order 4.

In other words, the adjacent same color pixels Gb3 and Gb4 of a lower order than the order of the object pixel Gr0 are present, and these pixels have the order 4. Accordingly, the correction is executed by replacing the pixel signal Gr0 with (Gb3+Gb4)/2 (step S34 which is executed in step S23).

In this way, when processing of step S32 or step S34 is executed or when it is determined that no adjacent defect pixel having the same color of a lower order than the order of the object pixel is present in step S33, it returns to processing shown in FIG. 5.

FIG. 7 is a flowchart showing the detail of additional correction processing in step S29 of FIG. 5.

The pixel defect correction portion 24 can select which of the one-dimensional correction and the two-dimensional correction should be applied to the processing of additional correction. When this processing is started, it is determined whether selection is made such that the additional correction is executed as the one-dimensional correction or selection is made such that the additional correction is executed as the two-dimensional correction (step S41).

Here, when it is determined that the additional correction is executed as the two-dimensional correction, the pixel defect correction portion 24 sets two-dimensional second neighborhood outside of the two-dimensional neighborhood (step S42), and executes the extended defect correction as explained with reference to FIG. 6 based on a pixel of the set second neighborhood (step S43).

In other words, when it goes to the extended defect correction processing of FIG. 6 in step S43, the processing is made by reading the neighborhood as the second neighborhood. Note that, in step S33 of FIG. 6 which is executed from step S43, when it is determined that no second adjacent defect pixel with the same color of a lower order than the order of the object pixel is present, the object pixel remains uncorrected.

On the other hand, when it is determined that the additional correction is executed as the one-dimensional correction, not the two-dimensional correction, the pixel defect correction portion 24 sets one-dimensional second neighborhood outside of the one-dimensional neighborhood (step S44), and executes one-dimensional additional correction as explained with reference to FIG. 8 (step S45).

Note that, in the second neighborhood set in step S42 or step S43, appropriately, the normal pixel is called as a second adjacent normal pixel, and the defect pixel is called as a second adjacent defect pixel.

After the above-described processing of step S43 or step S45 is executed, it returns to processing shown in FIG. 5.

FIG. 19 is a table showing a correction example where, when no normal pixel is present in the neighborhood and no defect pixel of a lower order than the order of the object pixel for correction is present, two normal pixels are present in the second neighborhood when the two-dimensional correction is executed.

In the example shown in FIG. 19, the object pixel R0 has the attribute 4 and the order 2, the adjacent same color pixel R1 has the attribute 5 and the order 2, the adjacent same color pixel R3 has the attribute 5 and the order 2, the adjacent same color pixel R5 has the attribute 1 and the order 1 and the adjacent same color pixel R7 has the attribute 2 and the order 1. In other words, no adjacent same color pixel of a lower order than the order of the object pixel R0 is present.

Then, in step S42 after it is determined that the two-dimensional correction is executed in step S41, a second adjacent pixel R2 on the upper right, a second adjacent pixel R4 on the upper left, a second adjacent pixel R6 on the lower left and a second adjacent pixel R8 on the lower right which are located outside of the pixels R1, R3, R5 and R7 which are the two-dimensional neighborhood are set to the two-dimensional second neighborhood. Note that the spatial distance around the object pixel R0 from R2, R4, R6 and R8 is larger than the spatial distance from R1, R3, R5 and R7. Consequently, it can be said that the second neighborhood is set outside of the neighborhood.

In the second neighborhood set in step S42, the second adjacent pixels R4, R8 have the attribute 8, while the second adjacent pixels R2, R6 are the normal pixels. Accordingly, in step S32 which is executed from step S43, the correction is executed by replacing the pixel signal R0 with (R2+R6)/2. In other words, when the second adjacent normal pixel is present, the pixel defect correction portion 24 corrects the pixel signal of the object pixel based on a pixel signal of the second adjacent normal pixel. In such a case, the order of the second adjacent pixels R4, R8 does not need to be considered.

FIG. 20 is a table showing a correction example in which, in a case where the two-dimensional correction is executed when no normal pixel is present in the neighborhood and when no defect pixel of a lower order than the order of the object pixel for correction is present, if no normal pixel is present in the second neighborhood and three pixels are present as the second adjacent defect pixels having the lowest order which are the defect pixels of a lower order than the order of the object pixel for correction.

In the example shown in FIG. 20, the object pixel R0 has the attribute 4 and the order 2, the adjacent same color pixel R1 has the attribute 5 and the order 2, the adjacent same color pixel R3 has the attribute 5 and the order 2, the adjacent same color pixel R5 has the attribute 1 and the order 1 and the adjacent same color pixel R7 has the attribute 2 and the order 1. In other words, no adjacent same color pixel of a lower order than the order of the object pixel R0 is present.

Then, in step S42 after it is determined that the two-dimensional correction is executed in step S41, the second adjacent pixel R2 on the upper right, the second adjacent pixel R4 on the upper left, the second adjacent pixel R6 on the lower left and the second adjacent pixel R8 on the lower right which are located outside of the pixels R1, R3, R5, R7 which are the neighborhood are set to the two-dimensional second neighborhood.

In the second neighborhood set in step S42, no normal pixel is present, and the second adjacent pixel R2 has the attribute 6 and the order 3, and the second adjacent pixels R4, R6 and F8 have the attribute 8 and the order 5. Accordingly, the adjacent same color pixel of a lower order than the order of the object pixel R0 is present in the second neighborhood, and the second adjacent defect pixels of the order 5 which has the lowest order are R4, R6 and R8.

Then, in step S34 which is executed from step S43, the correction is executed by replacing the pixel signal R0 with (R4+R6+R8)/3.

Figure 8:
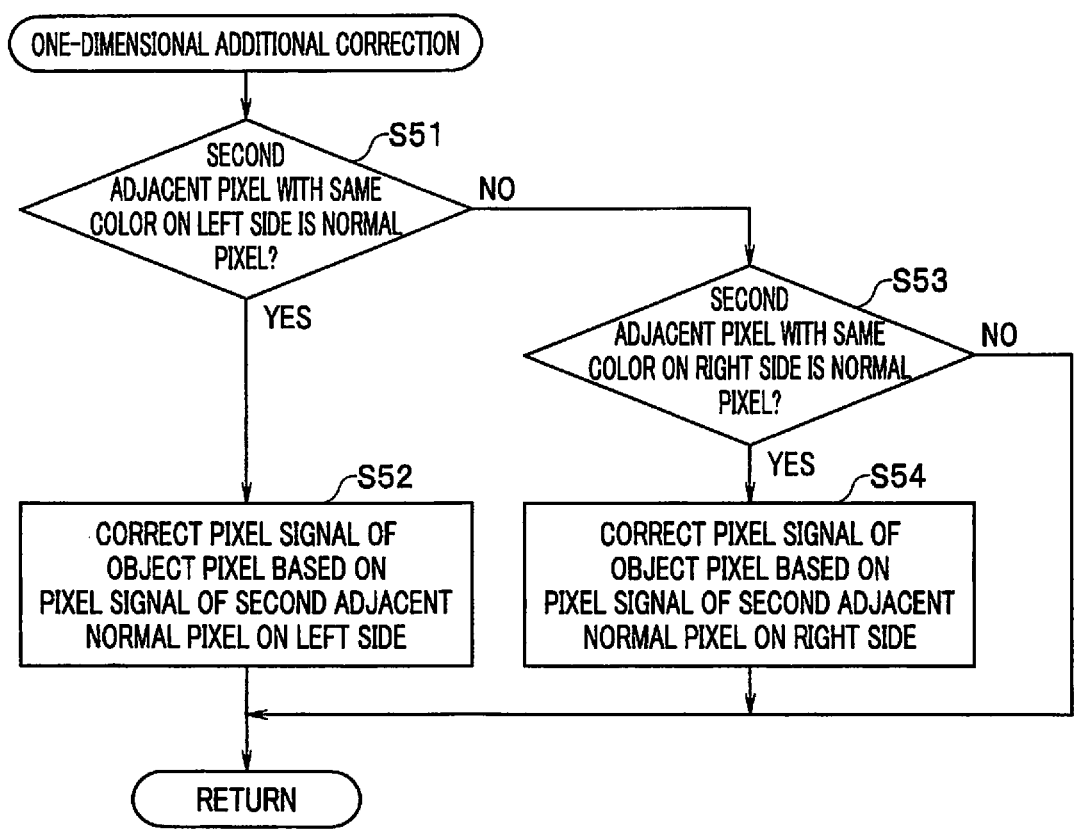
FIG. 8 is a flowchart showing the detail of one-dimensional additional correction processing in step S45 of FIG. 7 in the first embodiment.

FIG. 8 is a flowchart showing the detail of one-dimensional additional correction processing in step S45 of FIG. 7.

When this processing is started, it is determined whether the second adjacent pixel having the same color as the object pixel on the left side of the object pixel is the normal pixel (step S51).

Here, when it is determined that the second adjacent pixel is the normal pixel, the pixel signal of the object pixel is corrected based on a pixel signal of the second adjacent normal pixel on the left side (step S52).

Note that, here, the pixel signal of the second adjacent normal pixel on the left side is preferentially used in accordance with the order of raster scan. However, the invention is not limited to this.

Also, in step S51, when it is determined that the second adjacent pixel having the same color on the left side is not the normal pixel, next, it is determined whether the second adjacent pixel having the same color as the object pixel on the right side of the object pixel is the normal pixel (step S53).

Here, when it is determined that the second adjacent pixel is the normal pixel, the pixel signal of the object pixel is corrected based on a pixel signal of the second adjacent normal pixel on the right side (step S54).

In this way, when the processing of step S52 or step S54 is executed or when it is determined that the second adjacent pixel having the same color on the right side is not the normal pixel in step S53, it returns to processing shown in FIG. 7.

Consequently, when the second adjacent normal pixel is present, the pixel defect correction portion 24 corrects the pixel signal of the object pixel based on the pixel signal of the second adjacent normal pixel. On the other hand, when no second adjacent normal pixel is present in application of the one-dimensional correction, that is, when it is determined that the second adjacent pixel having the same color on the right side is not the normal pixel in step S53, the pixel defect correction portion 24 leaves the object pixel uncorrected.

In this way, the pixel defect correction portion 24 corrects the pixel signal of the object pixel based on the pixel signal of the second adjacent defect pixel having the lowest order in a case where no second adjacent normal pixel is present and in a case where there is the second adjacent defect pixel of a lower order than the order of the object pixel only in application of the two-dimensional correction (that is, in application of the one-dimensional correction, the correction of the pixel signal of the object pixel based on the pixel signal of the second adjacent defect pixel is not executed.)

FIG. 18 is a table showing a correction example where, when no normal pixel is present in the neighborhood and no defect pixel of a lower order than the order of the object pixel for correction is present, there is only one normal pixel in the second neighborhood when the one-dimensional additional correction is executed.

In the example shown in FIG. 18, the object pixel R0 has the attribute 4 and the order 2, the adjacent same color pixel R1 has the attribute 5 and the order 2, the adjacent same color pixel R3 has the attribute 5 and the order 2, the adjacent same color pixel R5 has the attribute 1 and the order 1 and the adjacent same color pixel R7 has the attribute 2 and the order 1. In other words, no adjacent same color pixel of a lower order than the order of the object pixel R0 is present.

Then, in step S42 after it is determined that the one-dimensional correction is executed in step S41, a second adjacent pixel R12 on the left side and a second adjacent pixel R9 on the right side which are located outside of the pixels R5, R1 which are the one-dimensional neighborhood are set to the one-dimensional second neighborhood.

In the second neighborhood set in step S42, the second adjacent pixel R12 on the left side has the attribute 6. However, the second adjacent pixel R9 on the right side has no information of the defect attribute, that is, the second adjacent pixel R9 is the normal pixel. Then, in step S54, the correction is executed by replacing the pixel signal R0 with the pixel signal R9. In such a case, the order of the second adjacent pixel R12 on the left side does not need to be considered.

Note that if pixels having the same color located further outside in the upper and lower direction, that is, pixels having the same color located above the pixel R3 and pixels having the same color located below the pixel R7 are tried to be considered, buffer data of 9 lines is required, which increases a circuit size. Accordingly, here, increase of a circuit size is prevented by using processing in which the same color pixels located further outside in the upper and lower direction are not considered.

The closer the spatial distance is, the higher spatial correlation between the pixel signals is. Consequently, the most suitable pixels to be used for correction of the object pixel R0 are the same color pixels R1, R3, R5 and R7 in the upper, lower, right and left directions, the second-most-suitable pixels are the same color pixels R2, R4, R6 and R8 adjacent in diagonal directions, and third-most-suitable pixels are the same color pixel R12 adjacent on the left side of R5 and the same color pixel R9 adjacent on the right side of R1.

When the Gr pixel and the Gb pixel are handled as the same color as explained with reference to step S22 and step S23, the pixel signals of the pixels having a closer spatial distance can be used compared to a case where the Gr pixel and the Gb pixels are handled as different colors. Consequently, the pixel signals having higher spatial correlation are used for defect correction, and a more appropriate correction value can be obtained. Moreover, by executing processing of step S22 and step S23 before processing of step S25, such merit can be effectively received.

While an explanation has been made listing the image sensor with a primary color Bayer arrangement as an example in the above description, the invention is not limited to this. For example, the image sensor in a complementary color system, not in a primary color system may be used. Also, not limited to Bayer arrangement, the image sensor with another arrangement may be used. Further, as the color of a pixel, various pixels including a white pixel (a pixel without a color filter), a pixel including an infrared transmission filter and a pixel including an ultraviolet transmission filter, etc. may be included. In any of these cases, the correction portion may correct the pixel signal of the object pixel based on the pixel signal of the pixel handled as the same color as the object pixel.

While a case where the image sensor 15 is a color image sensor including plurality of colors of pixels has been explained in the above description, even when the image sensor 15 is a monochrome image sensor, the above-described process can be applied in the same manner. In other words, in the case of a monochrome image as well, when the adjacent normal pixel is present, the correction portion may correct the pixel signal of the object pixel based on the pixel signal of the adjacent normal pixel, and when no adjacent normal pixel is present and the adjacent defect pixel of a lower order than the order of the object pixel is present, the correction portion may correct the pixel signal of the object pixel based on the pixel signal of the adjacent defect pixel having the lowest order. In other words, the monochrome image sensor is applied to a case where all pixels are handled as the same color.

According to the first embodiment thus configured, since the pixel defect detection/correction portion 20 detects the defect pixel which is generated after factory shipment to register the defect pixel in the internal memory 3. Accordingly, the state of the defect pixel of the image sensor after factory shipment can be dealt with.

While, conventionally, the object pixel remains uncorrected unless the adjacent normal pixel is present, according to this embodiment, when the adjacent defect pixel of a lower order than the order of the object pixel is present, the pixel signal of the object pixel is corrected based on the pixel signal of the adjacent defect pixel having the lowest order. As a result, the uncorrected defect pixels are reduced.

Since the pixel signal of the object pixel is corrected based on the pixel signal of the adjacent defect pixel having the lowest order, the severity of defect of the pixel signal of the object pixel can be mitigated, which suppresses the deterioration of the image quality of the image.

In this way, the defect pixel which increases chronologically can be dealt with, so that the deterioration of the image quality of the image over time can be suppressed.

Further, since the pixel signal of the object pixel is corrected based on the pixel signal of the pixel handled as the same color as the object pixel, even when the correlation between different color signals is low, an excellent correction result can be obtained.

When the pixel signal of the object pixel is corrected after the neighborhood is set with the handling of each of the R pixel, the Gr pixel, the B pixel and the Gb pixel as different colors, the same processing can be applied to the R pixel, the Gr pixel, the B pixel and the Gb pixel, respectively, which prevents complication and scaling up of a processing system by reducing the processing load.

Further, in the processing of the additional correction, the second neighborhood is set outside of the neighborhood, and when the second adjacent normal pixel is present, the pixel signal of the object pixel is corrected based on the pixel signal of the second adjacent normal pixel. Consequently, even when no adjacent normal pixel is present in the neighborhood and no adjacent defect pixel of a lower order than the order of the object pixel is present, the defect correction of the object pixel can be executed to suppress the deterioration of the image quality of the image.

In the additional correction in the two-dimensional correction, the pixel signal of the object pixel is corrected based on the pixel signal of the second adjacent defect pixel having the lowest order. Consequently, in a case where no second adjacent normal pixel is present and in a case where there is the second adjacent defect pixel of a lower order than the order of the object pixel, the defect correction of the object pixel can be executed to suppress the deterioration of the image quality of the image.

Whether it goes to processing of the additional correction can be selected in accordance with the operation input from the operation portion, so that the deterioration of the image quality can be prevented compared to a case where the correction is not made by selecting appropriate processing depending on the object.

The processing with the handling as the same color in which the pixel signal of the object pixel is corrected by handling the Gr pixel and the Gb pixels as the same color can be selected before the Gr pixel and the Gb pixel are handled as different colors. Consequently, by setting four G pixels adjacent to the object pixel in four diagonal directions as neighborhood, a more precise defect pixel correction can be made using the pixel signals of the pixels with a higher correlation, which can obtain the image with a higher image quality.

In such a case, it can be determined whether the processing with the handling as the same color should be selected in accordance with the operation input from the operation portion. Consequently, whether the processing with the handling as the same color is off to reduce the processing load to prevent complication and scaling up of the processing system or the processing with the handling as the same color is on to obtain the image with a higher image quality can be selected.

The association between the position of the defect pixel and the order of the defect pixel is used by dividing into a case where the exposure time is not lower than the threshold time or a case where the exposure time is less than the threshold time. Consequently, processing of the pixel on which the necessity of handling as the defect pixel is changed depending on the length of the exposure time can be appropriately executed.

The threshold time is set to be shorter in a case where the ISO sensitivity is the second ISO sensitivity than in a case where the ISO sensitivity is the first ISO sensitivity depending on whether the ISO sensitivity is the first ISO sensitivity or the second ISO sensitivity which is higher than the first ISO sensitivity. Consequently, the change of the severity of the defect of the defect pixel depending on a signal amplification ratio can be dealt with.

Since the position of the defect pixel and the order of the defect pixel are associated through the defect attribute of the defect pixel, the pixel defect order setting portion 22 can desirably set the order of the defect pixel to the position of the defect pixel in accordance with the change of the shooting condition. Accordingly, the order of the defect pixel can be appropriately set in accordance with the change of the shooting condition.

Each of the above-described portions other than the pixel defect detection/correction portion 20 is also configured to perform the function of each of the portions by causing a processor including hardware such as CPU to execute software. However, the configuration of each of the portions is not limited to such a configuration, but each of the portions may be configured by a processor including an electronic circuit (hardware) corresponding to each of the portions. Alternatively, each of the portions may be a circuit portion in a processor including an integrated circuit (hardware) such as FPGA (field programmable gate array).

Also, while the defect pixel correction apparatus has been mainly explained in the above description, a defect pixel correction method which executes the same processing as in the defect pixel correction apparatus may be adopted, or a processing program for causing a computer to execute the same processing as in the defect pixel correction apparatus, and a non-transitory computer-readable medium storing the processing program, etc. may be adopted.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A defect pixel correction apparatus which corrects a pixel signal of a defect pixel to a pixel signal outputted from an image sensor including a plurality of pixels including the defect pixel, the defect pixel correction apparatus comprising:
   a memory which associates and stores a position of the defect pixel with an order corresponding to a defect level of the defect pixel; and
   a processor comprising hardware, the processor being configured to:
   set a neighborhood to an object pixel which is the defect pixel,
   determining that both an adjacent non-defect pixel is not present and the adjacent defect pixel of a lower order than an order of the object pixel is present, based on stored contents of the memory, and
   correct a pixel signal of the object pixel based on a pixel signal of an adjacent defect pixel of a lowest order responsive to the determination that both an adjacent non-defect pixel is not present and the adjacent defect pixel of a lower order than an order of the object pixel is present, based on stored contents of the memory,
   wherein the adjacent defect pixel is a defect pixel in the neighborhood.

2. The defect pixel correction apparatus according to claim 1, wherein
   the defect pixel correction apparatus corrects the pixel signal of the defect pixel to a plurality of colors of pixel signals outputted from the image sensor including a plurality of colors of pixels, and
   the processor corrects the pixel signal of the object pixel based on a pixel signal of a pixel handled as same color as the object pixel.

3. The defect pixel correction apparatus according to claim 2, wherein
   the plurality of colors of pixels included by the image sensor are at least one R pixel, at least one Gr pixel, at least one B pixel and at least one Gb pixel arranged in a primary color Bayer arrangement, and
   the processor corrects the pixel signal of the object pixel after the neighborhood is set by handling the R pixel, the Gr pixel, the B pixel and the Gb pixel as different colors, respectively.

4. The defect pixel correction apparatus according to claim 3, wherein
   the processor proceeds to processing of additional correction when the adjacent non-defect pixel is not present in the neighborhood and the adjacent defect pixel of a lower order than an order of the object pixel is not present,
   in the processing of additional correction, second neighborhood is set outside of the neighborhood, and a non-defect pixel in the second neighborhood is defined as a second adjacent non-defect pixel, and a defect pixel in the second neighborhood is defined as a second adjacent defect pixel, and further, when the second adjacent non-defect pixel is present in the processing of additional correction, the pixel signal of the object pixel is corrected based on a pixel signal of the second adjacent non-defect pixel.

5. The defect pixel correction apparatus according to claim 4, wherein the processor can select which of one-dimensional correction and two-dimensional correction is applied to the processing of additional correction, the one-dimensional correction corrects the pixel signal of the object pixel based on a pixel signal of a pixel on a line at which the object pixel is arranged, the two-dimensional correction corrects the pixel signal of the object pixel based on a pixel signal of a pixel on a plurality of lines including a line adjacent to the line at which the object pixel is arranged, further, the processor corrects the pixel signal of the object pixel based on a pixel signal of the second adjacent defect pixel of a lowest order in a specific case only when the two-dimensional correction is applied, and the specific case is a case where the second adjacent non-defect pixel is not present and a case where the second adjacent defect pixel of a lower order than an order of the object pixel is present.

6. The defect pixel correction apparatus according to claim 4, further comprising:

an operation device which allows a user to execute an operation input, wherein the processor selects whether proceeding to the processing of additional correction is made in accordance with the operation input from the operation device.

7. The defect pixel correction apparatus according to claim 3, wherein the processor can select processing with handling as same color before correcting a pixel signal of the object pixel by handling the Gr pixel and the Gb pixel as different colors, the processing with handling as same color is processing of correcting the pixel signal of the object pixel by handling the Gr pixel and the Gb pixel as same color, further, when the processing with handling as same color is selected, the processor sets the neighborhood depending on whether the object pixel is the Gr pixel or the Gb pixel to correct the pixel signal of the object pixel, the processor sets four Gb pixels adjacent to the object pixel in four diagonal directions as the neighborhood when the object pixel is the Gr pixel, and the processor sets four Gr pixels adjacent to the object pixel in four diagonal directions as the neighborhood when the object pixel is the Gb pixel.

8. The defect pixel correction apparatus according to claim 7, further comprising:

an operation device which allows a user to execute an operation input, wherein the processor determines whether the processing with handling as same color is selected in accordance with the operation input from the operation device.

9. The defect pixel correction apparatus according to claim 1, wherein the memory stores an association between a position of the defect pixel and an order of the defect pixel with classification of a first association to a long exposure time and a second association to a short exposure time, the processor applies an order based on the first association when an exposure time when the image sensor generates the pixel signal is not less than a threshold time, and applies an order based on the second association when the exposure time is less than the threshold time.

10. The defect pixel correction apparatus according to claim 9, wherein the processor sets the threshold time such that, depending on whether ISO sensitivity applied to the pixel signal outputted from the image sensor is a first ISO sensitivity or a second ISO sensitivity which is higher than the first ISO sensitivity, the threshold time is shorter in the second ISO sensitivity than in the first ISO sensitivity.

11. The defect pixel correction apparatus according to claim 1, wherein the memory stores defect attribute of the defect pixel associated with a position of the defect pixel and stores the order associated with the defect attribute, and the memory associates the position of the defect pixel with the order of the defect pixel through defect attribute of the defect pixel.

12. A defect pixel correction method of correcting a pixel signal of a defect pixel to a pixel signal outputted from an image sensor including a plurality of pixels including the defect pixel, the defect pixel correction method comprising:

setting a neighborhood to an object pixel which is the defect pixel based on an output of a memory which associates and stores a position of the defect pixel with an order corresponding to a defect level of the defect pixel;

determining that both an adjacent non-defect pixel is not present and the adjacent defect pixel of a lower order than an order of the object pixel is present, based on stored contents of the memory; and correcting a pixel signal of the object pixel based on a pixel signal of an adjacent defect pixel of a lowest order responsive to a determination that both an adjacent non-defect pixel is not present and the adjacent defect pixel of a lower order than an order of the object pixel is present, based on stored contents of the memory, wherein the adjacent defect pixel is a defect pixel in the neighborhood.

13. The defect pixel correction method according to claim 12, further comprising:

correcting the pixel signal of the defect pixel to a plurality of colors of pixel signals outputted from the image sensor; and correcting the pixel signal of the object pixel based on a pixel signal of a pixel handled as same color as the object pixel.

14. The defect pixel correction method according to claim 13, wherein a plurality of colors of pixels included by the image sensor are at least one R pixel, at least one Gr pixel, at least one B pixel and at least one Gb pixel arranged in a primary color Bayer arrangement, and the pixel signal of the object pixel is corrected after the neighborhood is set by handling the R pixel, the Gr pixel, the B pixel and the Gb pixel as different colors, respectively.

15. The defect pixel correction method according to claim 14, wherein proceeding to processing of an additional correction is executed when the adjacent non-defect pixel is not present in the neighborhood and the adjacent defect pixel of a lower order than an order of the object pixel is not present, in the processing of additional correction, a second neighborhood is set outside of the neighborhood, and a non-defect pixel in the second neighborhood is defined as a second adjacent non-defect pixel and a defect pixel in the second neighborhood is defined as a second adjacent defect pixel, and further, in the processing of the additional correction, when the second adjacent non-defect pixel is present, the pixel signal of the object pixel is corrected based on a pixel signal of the second adjacent non-defect pixel.

16. The defect pixel correction method according to claim 15, further comprising:

selecting which of one-dimensional correction and two-dimensional correction is applied to the processing of the additional correction, wherein the one-dimensional correction corrects the pixel signal of the object pixel based on a pixel signal of a pixel on a line at which the object pixel is arranged, and the two-dimensional correction corrects the pixel signal of the object pixel based on a pixel signal of a pixel on a plurality of lines including a line adjacent to the line at which the object pixel is arranged; and further, correcting the pixel signal of the object pixel based on a pixel signal of the second adjacent defect pixel of a lowest order in a specific case only when the two-dimensional correction is applied, wherein the specific case is a case where the second adjacent non-defect pixel is not present and a case where the second adjacent defect pixel of a lower order than an order of the object pixel is present.

17. A non-transitory computer-readable medium storing a computer program, wherein the computer program is a program which causes the computer to correct a pixel signal of a defect pixel to a pixel signal outputted from an image sensor including a plurality of pixels including the defect pixel, and based on an output of a memory which associates and stores a position of the defect pixel with an order of the defect pixel, the computer program causes the computer to execute the following:

setting a neighborhood to an object pixel which is the defect pixel;

determining that both an adjacent non-defect pixel is not present and the adjacent defect pixel of a lower order than an order of the object pixel is present, based on stored contents of the memory; and correcting a pixel signal of the object pixel based on a pixel signal of an adjacent defect pixel of a lowest order responsive to a determination that both an adjacent non-defect pixel is not present and the adjacent defect pixel of a lower order than an order of the object pixel is present, based on information stored in the memory, wherein the adjacent defect pixel is a defect pixel in the neighborhood.

18. The non-transitory computer-readable medium storing a computer program according to claim 17, wherein the computer program causes the computer to execute the following:

correcting the pixel signal of the defect pixel to a plurality of colors of pixel signals outputted from the image sensor; and correcting the pixel signal of the object pixel based on a pixel signal of a pixel handled as same color as the object pixel.

19. The non-transitory computer-readable medium storing a computer program according to claim 18, wherein a plurality of colors of pixels included by the image sensor are at least one R pixel, at least one Gr pixel, at least one B pixel and at least one Gb pixel arranged in a primary color Bayer arrangement, and the computer program causes the computer to execute the following correcting the pixel signal of the object pixel after the neighborhood is set by handling the R pixel, the Gr pixel, the B pixel and the Gb pixel as different colors, respectively.

20. The non-transitory computer-readable medium storing a computer program according to claim 19, wherein the computer program further causes the computer to execute the following proceeding to processing of additional correction when the adjacent non-defect pixel is not present in the neighborhood and the adjacent defect pixel of a lower order than an order of the object pixel is not present, wherein in the processing of additional correction, a second neighborhood is set outside of the neighborhood, and a non-defect pixel in the second neighborhood is defined as a second adjacent non-defect pixel and a defect pixel in the second neighborhood is defined as a second adjacent defect pixel, further, in the processing of additional correction, when the second adjacent non-defect pixel is present, the pixel signal of the object pixel is corrected based on a pixel signal of the second adjacent non-defect pixel.

* * * * *